(12) United States Patent
Takashima et al.

(10) Patent No.: US 8,193,704 B2
(45) Date of Patent: Jun. 5, 2012

(54) PEROVSKITE OXIDE THIN FILM EL ELEMENT

(75) Inventors: Hiroshi Takashima, Tsukuba (JP);
Yoshiyuki Inaguma, Tsukuba (JP);
Noboru Miura, Tsukuba (JP);
Kazushige Ueda, Tsukuba (JP);
Mitsuru Itoh, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 7 days.

(21) Appl. No.: 12/735,793

(22) PCT Filed: Feb. 17, 2009

(86) PCT No.: PCT/JP2009/052680
§ 371 (c)(1),
(2), (4) Date: Aug. 18, 2010

(87) PCT Pub. No.: WO2009/104595
PCT Pub. Date: Aug. 27, 2009

(65) Prior Publication Data
US 2011/0121722 A1   May 26, 2011

(30) Foreign Application Priority Data
Feb. 19, 2008 (JP) .................. 2008-037038

(51) Int. Cl.
*H01J 1/62* (2006.01)
(52) U.S. Cl. .................. 313/506; 313/503; 313/509
(58) Field of Classification Search ........... 313/498–512
See application file for complete search history.

(56) References Cited

U.S. PATENT DOCUMENTS

2002/0060325 A1* 5/2002 Yano et al. .................. 257/103
(Continued)

FOREIGN PATENT DOCUMENTS

JP      11-219601 A     8/1999
(Continued)

OTHER PUBLICATIONS

Arai, N. et al. "Combinatorial fabrication and cathodoluminescence properties of composition spread $MHfO_3:Tm^{3+}$ (M = Ca, Sr and Ba) films" Applied Surface Science 197-198 (2002) 402-405.

(Continued)

*Primary Examiner* — Bumsuk Won
(74) *Attorney, Agent, or Firm* — Wolf, Greenfield & Sacks, P.C.

(57) ABSTRACT

There are provided a perovskite oxide thin film EL element in which a hole transport layer/a light-emitting layer/an electron transport layer comprising a perovskite oxide thin film are formed on a lower electrode, and an upper electrode is formed thereon, and a perovskite oxide thin film EL element that provides red light emission in the vicinity of a wavelength of 610 nm, which is the basis of display making. A perovskite oxide thin film EL element comprising a lower electrode 1 comprising a polished single crystal substrate, an electron transport layer 2 comprising a perovskite oxide thin film, which is a dielectric, formed on the lower electrode 1, a light-emitting layer 3 comprising a perovskite oxide thin film formed on the electron transport layer 2, a hole transport layer 4 comprising a perovskite oxide thin film, which is a dielectric, formed on the light-emitting layer 3, a buffer layer 5 formed on the hole transport layer 4, and a transparent upper electrode 6 formed on the buffer layer 5.

9 Claims, 17 Drawing Sheets

U.S. PATENT DOCUMENTS

| | | | | |
|---|---|---|---|---|
| 2002/0064682 | A1* | 5/2002 | Yano et al. | 428/690 |
| 2002/0177008 | A1* | 11/2002 | Shirakawa et al. | 428/690 |
| 2005/0218466 | A1* | 10/2005 | Kondo et al. | 257/415 |
| 2005/0248267 | A1* | 11/2005 | Gyoutoku et al. | 313/506 |
| 2006/0092498 | A1* | 5/2006 | Sato et al. | 359/321 |
| 2006/0261329 | A1* | 11/2006 | Muccini et al. | 257/40 |
| 2007/0085470 | A1 | 4/2007 | Ando et al. | |

FOREIGN PATENT DOCUMENTS

| | | |
|---|---|---|
| JP | 2002-299063 A | 10/2002 |
| JP | 2003-183646 A | 7/2003 |
| JP | 2006-134691 A | 5/2006 |
| JP | 2007-146102 A | 6/2007 |
| JP | 2007-157501 A | 6/2007 |
| JP | 2008-019317 A | 1/2008 |
| WO | WO 2005/042669 A1 | 5/2005 |
| WO | WO 2008/007559 A1 | 1/2008 |

OTHER PUBLICATIONS

Block, B. et al. "Photoluminescence properties of $Er^{3+}$ -doped $BaTiO_3$ thin films" Applied Physics Letters, vol. 65, No. 1, Jul. 4, 1994.

Endo, T. et al. "$Eu^{2+}$ luminescence in $Sr_{n+1}Sn_nO_{3n+1}$ with layered perovskite structure" Materials Science Letters, vol. 11, No. 19, Oct. 1, 1992 1330-1332.

Inaguma, Y. et al. "Photoluminescence of Praseodymium-Doped $Sr_{n-1}Ti_nO_{3n+1}$ (n= 1, 2, ∞)" Japanese Journal of Applied Physics, vol. 44, No. 1B, 2005, pp. 761-764.

Kan, D. et al. "Blue-light emission at room temperature from Ar+-irradiated $SrTiO_3$" Nature Materials, vol. 4, Nov. 2005, pp. 816-819.

Kyomen, T. et al. "Photoluminescence Properties of Pr-Doped $(Ca,Sr,Va)TiO_3$" Chem. Mater. 2005, 17, 3200-3204.

Liu, Z. et al. "Synthesis and luminescent properties of a new green afterglow phosphor $CaSnO_3$:Tb" Materials Chemistry and Physics 93 (2005) 129-132.

Lu, Z. et al., "Preparation and luminescence properties of $Eu^{3+}$-doped $MSnO_3$ (M = Ca, Sr and Ba) perovskite materials" Journal of Alloys and Compounds 387 (2005).

Okamoto, S. et al. "Characteristic enhancement of emission from $SrTiO_3$:$Pr^{3+}$ by addition of group-IIIb ions" Applied Physics Letters, vol. 78, No. 5, Jan. 29, 2001.

Takashima, H. et al. "Photoluminescence in praseodymium-doped titanate perovskite films epitaxially grown by pulsed laser deposition" Applied Physics Letters 89, No. 26, Dec. 25, 2006.

Wellenius, P. et al. "A visible transparent electroluminescent europium doped gallium oxide device" Materials Science and Engineering B 146 (2008) 252-255.

International Search Report, application No. PCT/JP2009/052680 dated May 26, 2009.

* cited by examiner

PEROVSKITE OXIDE THIN FILM EL ELEMENT

TECHNICAL FIELD

The present invention relates to a perovskite oxide thin film EL element.

BACKGROUND ART

In recent years, EL elements using organic materials and inorganic materials, such as rare earth-added ZnS and $BaAl_2S_4$, for the light-emitting layer have been developed. But, a problem of such EL elements is that the light emission characteristics are drastically degraded by atmospheric exposure. It is indicated that when EL elements are formed with these materials, wrapping technique and sealing technique during assembly are necessary, and their fabrication and manufacturing line are complicated. Therefore, the product cost is expensive. Furthermore, the raw materials used for the organic EL light-emitting layer are more expensive than platinum in terms of cost per gram and therefore are a factor of high cost. Further, in inorganic EL, the drive voltage is generally 200 V or more. Therefore, the drive power supply circuit is large, and slimming down is more difficult than in organic EL.

A perovskite oxide structure is simple and is of a chemically stable material. Therefore, elimination of degradation due to atmospheric exposure and elimination of aged degradation are expected. In recent years, the research and development of fluorescent materials with perovskite oxide polycrystal powders have been actively performed, and good fluorescence characteristics have been obtained. On the other hand, for epitaxial thin films, three primary colors of red, green, and blue, which are the basis of display fabrication, have also begun to be developed, and good fluorescence has been obtained, whereas EL provided by electric field application has not been obtained yet. In application to displays and the like, an EL element formed by sandwiching a light-emitting layer between dielectric layers on a thin film electrode material, with thin films, and fabricating an upper electrode is essential, and the development of a multilayer structure of dielectrics (used as the hole transport layer and the electron transport layer) and the light-emitting layer with thin films, and the development of an EL element achieving an interface control technique providing good adhesion between the dielectric and the electrode material are supposed to be urgently necessary.

For the fluorescence characteristics of oxide polycrystals, Non-Patent Document 1 shows that fluorescence characteristics are obtained by substitution with Ca, Sr, or Ba in a polycrystal $ASnO_3$ perovskite structure. Non-Patent Document 2 shows that blue fluorescence is obtained in a polycrystal Sn, layered perovskite structure. Non-Patent Document 3 shows fluorescence characteristics when polycrystal $CaSnO_3$ is substituted with Tb. Non-Patent Document 4 shows red fluorescence characteristics in a polycrystal, layered perovskite $Sr_{n+1}TiO_{3n+1}$ system. Non-Patent Document 5 shows that regarding a $SrTiO_3$ single crystal and thin film, blue white fluorescence occurs due to oxygen loss. Non-Patent Document 6 shows that red fluorescence characteristics are obtained when polycrystal $SrTiO_3$ is substituted with a Pr atom. Non-Patent Document 7 shows the red fluorescence characteristics of polycrystal, Pr atom-substituted (CaSrBa)$TiO_3$.

For the fluorescence characteristics of oxide thin films, Non-Patent Document 8 shows the blue fluorescence characteristics of a thin film, $MHfO_3$:substituted-Tm. Non-Patent Document 9 shows the fluorescence characteristics of a $BaTiO_3$ thin film substituted with an Er atom. Non-Patent Document 10 shows the red fluorescence characteristics of a thin film, $CaSrTiO_3$:substituted-Pr. Patent Document 1 shows a method for manufacturing a double oxide phosphor thin film in which an inorganic base material, such as yttrium aluminate, is substituted with a metal ion. Patent Document 2 shows a method for manufacturing a thin film that emits light by the application of a mechanical external force, with a material containing a rare earth metal ion or a transition metal ion in an inorganic base material.

For the EL characteristics of oxide thin films, Non-Patent Document 11 shows the red light emission characteristics of a thin film EL element in which $Ga_2O_3$ is substituted with Eu. Patent Document 3 shows an inorganic-thin film EL element using a ceramic sheet as a transport layer.

For oxide polycrystals, Patent Document 4 shows the fluorescence characteristics of a polycrystal Sn perovskite oxide system. Patent Document 5 shows that the fluorescence characteristics of red, green, and blue, which are three primary colors of light, are obtained by a Ti thin film or a Sn thin film having an oxide perovskite structure. Patent Document 6 shows regarding an EL element using a $Zn_2SiO_4$:Mn thin film, which is a non-perovskite structure, for a light-emitting layer, a method for improving luminance and life.

LIST OF DOCUMENTS

Non-Patent Document 1: J. Alloy Compd. Vol. 387, pp L1-4 (2005)
Non-Patent Document 2: J. Mater. Sci. Lett., Vol. 11, 1330 (1992)
Non-Patent Document 3: Materials Chemistry and Physics Vol. 93, pp. 129-132 (2005)
Non-Patent Document 4: J. J. Appl. Phys. Vol. 44, pp. 761-764 (2005)
Non-Patent Document 5: Nature materials Vol 4, 816 (2005)
Non-Patent Document 6: Appl. Phy. Lett Vol 78, 655 (2001)
Non-Patent Document 7: Chem. Mater. Vol 17, 3200 (2005)
Non-Patent Document 8: Appl. Surf. Sci. Vol 197-198, 402 (2002)
Non-Patent Document 9: Appl. Phy. Lett Vol 65, 25 (1994)
Non-Patent Document 10: Appl. Phy. Lett Vol 89, 261915-1 (2006)
Non-Patent Document 11: Materials Science and Engineering B Vol 146, 252 (2008)
Patent Document 1: Japanese Patent Laid-Open No. 2003-183646
Patent Document 2: Japanese Patent Laid-Open No. 11-219601
Patent Document 3: Japanese Patent Laid-Open No. 2007-157501
Patent Document 4: Japanese Patent Application No. 2005-322286
Patent Document 5: Japanese Patent Application No. 2006-190755
Patent Document 6: Japanese Patent Laid-Open No. 2006-134691

DISCLOSURE OF THE INVENTION

Problems to be Solved by the Invention

It is an object of the present invention to provide a perovskite oxide thin film EL element in which as a basic structure, a hole transport layer/a light-emitting layer/an electron transport layer comprising a perovskite oxide thin film are formed on a lower electrode, and an upper electrode is formed thereon.

It is another object of the present invention to provide a perovskite oxide thin film EL element that provides red light emission in the vicinity of a wavelength of 610 nm, among red, green, and blue, which are the basis of display making.

Means for Solving the Problems

The present invention uses the following means to solve the above problems.

A first means is a perovskite oxide thin film EL element comprising a lower electrode comprising a polished single crystal substrate, an electron transport layer comprising a perovskite oxide thin film, which is a dielectric, formed on the lower electrode, a light-emitting layer comprising a perovskite oxide thin film formed on the electron transport layer, a hole transport layer comprising a perovskite oxide thin film, which is a dielectric, formed on the light-emitting layer, a buffer layer formed on the hole transport layer, and a transparent upper electrode formed on the buffer layer.

A second means is a perovskite oxide thin film EL element comprising a lower electrode comprising a polished single crystal substrate, a first transport layer comprising a perovskite oxide thin film, which is a dielectric, formed on the lower electrode, a first light-emitting layer comprising a perovskite oxide thin film formed on the first transport layer, a second transport layer comprising a perovskite oxide thin film, which is a dielectric, formed on the first light-emitting layer, a second light-emitting layer comprising a perovskite oxide thin film formed on the first transport layer formed on the second transport layer, a third transport layer comprising a perovskite oxide thin film, which is a dielectric, formed on the second light-emitting layer, a buffer layer formed on the third transport layer, and a transparent upper electrode formed on the buffer layer.

A third means is a perovskite oxide thin film EL element comprising a lower electrode comprising a polished single crystal substrate of $SrTiO_3(001)$ in which 0.1% or more of Ti is substituted with Nb, an electron transport layer comprising a thin film of perovskite oxide $SrTiO_3$, which is a dielectric, formed on the lower electrode, a light-emitting layer comprising a thin film of perovskite oxide $((Ca_{1-x}Sr_x)_{1-y}Pr_y)TiO_3$: $0 \leq x \leq 1$ and $0.001 \leq y \leq 0.2$ formed on the electron transport layer, a hole transport layer comprising a thin film of perovskite oxide $SrTiO_3$, which is a dielectric, formed on the light-emitting layer, a $CeO_2$ film buffer layer formed on the hole transport layer, and a transparent upper electrode comprising an ITO film formed on the buffer layer.

A fourth means is a perovskite oxide thin film EL element comprising a lower electrode comprising a polished single crystal substrate of $SrTiO_3(001)$ in which 0.1% or more of Ti is substituted with Nb, a first transport layer comprising a thin film of perovskite oxide $SrTiO_3$, which is a dielectric, formed on the lower electrode, a first light-emitting layer comprising a thin film of perovskite oxide $((Ca_{1-x}Sr_x)_{1-y}Pr_y)TiO_3$: $0 \leq x \leq 1$ and $0.001 \leq y \leq 0.2$ formed on the first transport layer, a second transport layer comprising a thin film of perovskite oxide $SrTiO_3$, which is a dielectric, formed on the first light-emitting layer, a second light-emitting layer comprising a thin film of perovskite oxide $((Ca_{1-x}Sr_x)_{1-y}Pr_y)TiO_3$: $0 \leq x \leq 1$ and $0.001 \leq y \leq 0.2$ formed on the second transport layer, a third transport layer comprising a thin film of perovskite oxide $SrTiO_3$, which is a dielectric, formed on the second light-emitting layer, a $CeO_2$ film buffer layer formed on the third transport layer, and a transparent upper electrode comprising an ITO film formed on the buffer layer.

A fifth means is a perovskite oxide thin film EL element comprising a polished single crystal substrate of $SrTiO_3$ (001), a lower electrode comprising a thin film of $SrTiO_3$ in which 0.1% or more of Ti is substituted with Nb, formed on the substrate, an electron transport layer comprising a thin film of perovskite oxide $SrTiO_3$, which is a dielectric, formed on the lower electrode, a light-emitting layer comprising a thin film of perovskite oxide $((Ca_{1-x}Sr_x)_{1-y}Pr_y)TiO_3$: $0 \leq x \leq 1$ and $0.001 \leq y \leq 0.2$ formed on the electron transport layer, a hole transport layer comprising a thin film of perovskite oxide $SrTiO_3$, which is a dielectric, formed on the light-emitting layer, a $CeO_2$ film buffer layer formed on the hole transport layer, and a transparent upper electrode comprising an ITO film formed on the buffer layer.

A sixth means is a perovskite oxide thin film EL element comprising a lower electrode comprising a polished single crystal substrate of $SrTiO_3(001)$ in which 0.1% or more of Ti is substituted with Nb, an electron transport layer comprising a thin film of perovskite oxide $BaTiO_3$, which is a dielectric, formed on the lower electrode, a light-emitting layer comprising a thin film of perovskite oxide $((Ca_{1-x}Sr_x)_{1-y}Pr_y)TiO_3$: $0 \leq x \leq 1$ and $0.001 \leq y \leq 0.2$ formed on the electron transport layer, a hole transport layer comprising a thin film of perovskite oxide $BaTiO_3$, which is a dielectric, formed on the light-emitting layer, a $CeO_2$ film buffer layer formed on the hole transport layer, and a transparent upper electrode comprising an ITO film formed on the buffer layer.

A seventh means is the perovskite oxide thin film EL element in any one means of the first to the sixth means, wherein the transport layer comprising perovskite oxide, which is a dielectric, has a lattice constant in the range of 0.39 nm±0.03 nm.

An eighth means is the perovskite oxide thin film EL element in any one means of the first to the seventh means, wherein the perovskite oxide thin film EL element is heat-treated in the range of 900° C. or more and 1200° C. or less.

Advantages of the Invention

According to the present invention, a perovskite oxide thin film EL element with thin films is composed of an electron transport layer and a hole transport layer and a light emitter thin film comprising an insulator having excellent crystallinity. Therefore, insulator thin films having a large dielectric constant value is achieved. Thus, an electric field is efficiently applied to the light-emitting layer, enabling low voltage drive. Thus, the miniaturization of a drive power supply circuit system is achieved, and the miniaturization of a display with a slim panel would be promoted. Furthermore, a perovskite oxide material comprising $SrTiO_3$ as the base material has excellent chemical stability. Therefore, even if the perovskite oxide material is exposed to the atmosphere for a long period, no change in composition occurs, and no large change in light emission phenomenon occurs. By using these features, the degradation of the crystallinity of the sample due to atmospheric exposure is extremely small. Therefore, the degradation of light emission characteristics is reduced. Thus, complicated wrapping technique and the like during assembly are unnecessary, and cost reduction is expected.

Furthermore, according to the present invention, a perovskite oxide thin film EL element having excellent red light emission characteristics, among three primary colors of red, green, and blue, which are the basic primary colors of a display, is obtained with perovskite oxide epitaxial thin films, and as a result, it is possible to promote the development of electroluminescent (EL) elements with oxide epitaxial thin films.

Furthermore, according to the present invention, Ca, Sr, and Ti atoms, which exist in abundance on earth, and an extremely slight amount of rare earth element Pr atoms are used, thus being able to contribute to material cost reduction.

| | Description of Symbols |
|---|---|
| 1 | substrate (lower electrode) |
| 2 | electron transport layer |
| 3 | light-emitting layer |
| 4 | hole transport layer |
| 5 | buffer layer |
| 6 | transparent electrode (upper electrode) |
| 7 | substrate (lower electrode) |
| 8 | transport layer |
| 9 | light-emitting layer |
| 10 | transport layer |
| 11 | light-emitting layer |
| 12 | transport layer |
| 13 | buffer layer |
| 14 | transparent electrode (upper electrode) |
| 15 | substrate |
| 16 | lower electrode |
| 17 | electron transport layer |
| 18 | light-emitting layer |
| 19 | hole transport layer |
| 20 | buffer layer |
| 21 | transparent electrode (upper electrode) |
| 22 | substrate (lower electrode) |
| 23 | electron transport layer |
| 24 | light-emitting layer |
| 25 | hole transport layer |
| 26 | buffer layer |
| 27 | transparent electrode (upper electrode) |

BEST MODE FOR CARRYING OUT THE INVENTION

The basic structure of a perovskite oxide thin film EL element according to the present invention comprises a structure in which a hole transport layer/a light-emitting layer/an electron transport layer comprising a thin film are formed on a lower electrode, and an upper electrode is formed thereon. A dielectric material is used for the hole transport layer and the electron transport layer, and $SrTiO_3$ or $BaTiO_3$, which is a perovskite oxide material, is used by forming a thin film. A red fluorescent material, which is a perovskite oxide thin film, $CaSrTiO_3$:substituted Pr, is used for the light-emitting layer. These materials have a crystal lattice constant in the vicinity of 3.90 nm, and therefore have excellent lattice matching properties, and can be oriented up to the upper thin film and grown with excellent crystallinity also as a laminated structure.

In the perovskite oxide thin film EL element of the present invention, a multilayer structure of an oxide light emitter epitaxial thin film and dielectric thin films used as the hole transport layer and the electron transport layer is formed by a pulse laser deposition method, and a perovskite oxide fluorescent material and a perovskite dielectric material such as SrTiO$_3$, which are target materials, are formed into thin films by the pulse laser deposition method. An electrically conductive material comprising, as the base material, SrTiO$_3$ having good lattice matching properties with the above materials is used for the lower electrode (substrate), and an ITO material thin film is used for the upper electrode (transparent electrode). Then, suitable heat treatment is performed to obtain a sufficient withstand voltage, thereby providing an epitaxial thin film EL element having light emission characteristics in the vicinity of a wavelength of 610 nm (red), which are the basis of display manufacturing.

Next, a first embodiment of the present invention will be described, using FIGS. 1 to 3.

Figure 1:
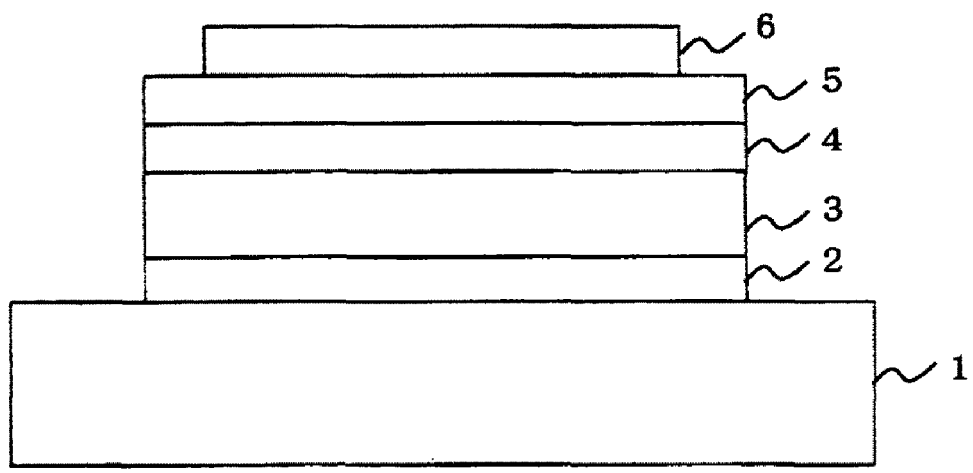
FIG. 1 is a diagram showing the configuration of a perovskite oxide thin film EL element in which a multilayer film of an electron transport layer 2/a light-emitting layer 3/a hole transport layer 4 comprising a thin film is formed on a substrate (lower electrode) 1, and a transparent electrode (upper electrode) 6 is formed thereon via a buffer layer 5, according to the invention in a first embodiment.

FIG. 1 is a diagram showing the configuration of a perovskite oxide thin film EL element in which a multilayer film of an electron transport layer 2/a light-emitting layer 3/a hole transport layer 4 comprising a thin film is formed on a substrate (lower electrode) 1, and a transparent electrode (upper electrode) 6 is formed thereon via a buffer layer 5, according to the invention in this embodiment.

In FIG. 1, reference numeral 1 denotes a Nb-substituted STO(100) substrate; reference numeral 2 denotes an electron transport layer, an epitaxial film, SrTiO$_3$; reference numeral 3 denotes a light-emitting layer, an epitaxial film, CaSrTiO$_3$:Pr; reference numeral 4 denotes a hole transport layer, an epitaxial film, SrTiO$_3$; reference numeral 5 denotes a buffer layer, an epitaxial film, CeO$_2$; and reference numeral 6 denotes a transparent electrode, ITO.

The pulse laser deposition method is used for manufacturing the perovskite oxide thin film EL element of the present invention. According to this method, since it is possible to freely select a film formation atmosphere, it is possible to control the amount of oxygen in a formed thin film, and it is possible to extremely reduce the degradation of electrical characteristics and fluorescence characteristics due to oxygen loss and the like, during the growth of an oxide thin film. The pulse laser deposition method is a method for irradiating a target material comprising an oxide with an ArF (wavelength: 193 nm) excimer laser beam in low pressure oxygen at 1 Torr or less, turning the target material into a plasma to form a plume, disposing a heated substrate material on a surface opposed to the target material, and depositing a thin film. At temperatures of 1000° C. or less, cluster growth is dominant. Therefore, it is possible to deposit the target material with its stoichiometric composition. The laser irradiation frequency is 4 Hz to 8 Hz, and the film formation time is 30 minutes to 180 minutes. The distance between the substrate and the target is 30 mm to 34 mm. The laser energy is about 1.0 J/cm$^2$ to 1.2 J/cm$^2$. In the present invention, the pulse laser deposition method is used, but a sputtering method, one of other gas phase methods, and film formation methods with a liquid phase, such as a sol-gel method, may be used for a thin film.

As a typical example, a polished, 1% Nb-substituted SrTiO$_3$(001) single crystal substrate having electrical conductivity is used for the substrate (lower electrode) 1. The crystal structure of the substrate 1 is tetragonal, and the substrate 1 has a lattice constant of 3,905 nm, and an electrical conductivity of 0.02 Ωcm or less at room temperature, and can be used as the lower electrode 1. Many perovskite oxide materials have a lattice constant in the vicinity of the numerical value of the above lattice constant and have good lattice matching properties with this substrate material. Therefore, it is possible to grow an oxide epitaxial thin film having excellent crystallinity on this substrate (lower electrode) 1. A polished, 0.1% Nb-substituted SrTiO$_3$(001) single crystal substrate has a resistivity of 0.1 Ωcm or less. Therefore, a polished, 0.1% or more Nb-substituted SrTiO$_3$(001) single crystal substrate can be used.

Figure 17:
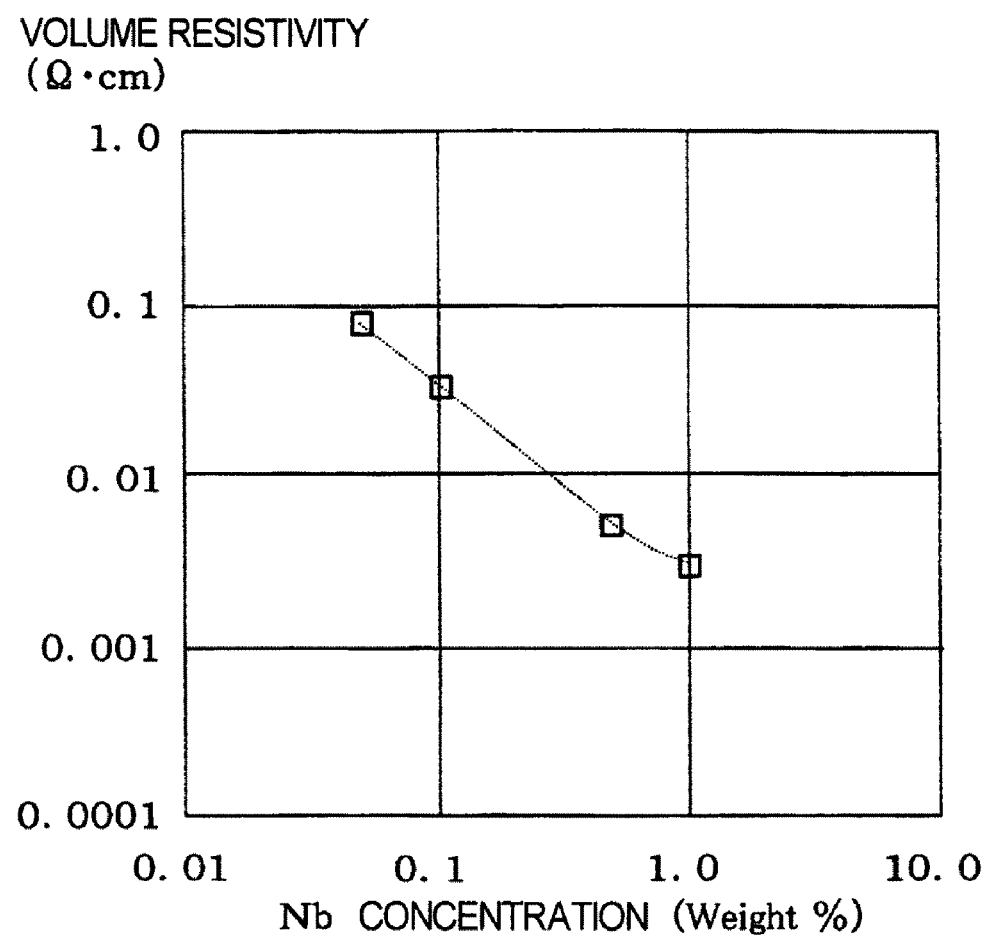
FIG. 17 is a Nb substitution amount-resistivity characteristic diagram.

FIG. 17 is a Nb substitution amount-resistivity characteristic diagram. The characteristic values of the Nb substitution amount-resistivity characteristics are shown in the following Table 1.

TABLE 1

| No | Nb concentration (Weight %) | Volume resistivity (Ω · cm) |
|---|---|---|
| 1 | 0.049 | 0.076 |
| 2 | 0.105 | 0.032 |
| 3 | 0.480 | 0.055 |
| 4 | 1.000 | 0.003 |

The Nb substitution amount-resistivity characteristics shown in FIG. 17 and Table 1 reveal that when the Nb concentration is at least a substitution concentration of 0.1% or more, the volume resistivity falls within a practically unproblematic range of 0.1 Ωcm or less.

A perovskite oxide SrTiO$_3$ thin film, which is the electron transport layer 2, is formed on the substrate (lower electrode) 1 at an oxygen pressure of 700 mTorr at substrate temperatures of 700° C. Then, a perovskite oxide Ca$_{0.6}$Sr$_{0.4}$TiO$_3$: 0.2% Pr thin film, which is the light-emitting layer 3, is formed at an oxygen pressure of 700 mTorr at substrate temperatures of 700° C. Then, a perovskite oxide SrTiO$_3$ thin film, which is the hole transport layer 4, is formed at an oxygen pressure of 700 mTorr at substrate temperatures of 700° C. to manufacture a multilayer structure of the electron transport layer 2/the light-emitting layer 3/the hole transport layer 4 on the substrate (lower electrode) 1.

Then, a CeO$_2$ film is continuously formed as the buffer layer 5 at an oxygen pressure of 700 mTorr at substrate temperatures of 700° C. It has been experimentally clarified that the indium atoms of the upper electrode 6 comprising an ITO film cause the luminance degradation of the light-emitting layer 3. This CeO$_2$ buffer layer 5 serves as the buffer layer 5 for completely separating the indium and the light-emitting layer 3. At this time, the oxygen pressure was varied in the range of 10 mTorr or more and 700 mTorr or less, but similar results were obtained.

When the ITO film of the transparent upper electrode 6 is formed without performing heat treatment, and an alternating voltage is applied, it is noted that dielectric breakdown occurs before the start of light emission, and light emission characteristics are not confirmed. Therefore, atmospheric heat treatment is performed in oxygen in the range of 900° C. or more and 1200° C. or less to improve the withstand voltage of the light-emitting layer 3 to enable light emission, and then, a transparent electrically conductive film, ITO, is formed on top to provide the upper electrode 6.

In the manufacturing of the perovskite oxide thin film EL element of the present invention, film formation was performed at each of substrate temperatures of 600° C., 700° C., and 800° C. In order to examine the crystal structure, x-ray diffraction was measured. As a result, it was confirmed that the multilayer structure was epitaxially grown in the (001) direction at all temperatures. As a typical example, an x-ray diffraction pattern during growth at 700° C. is shown in FIG. 2.

Figure 2:
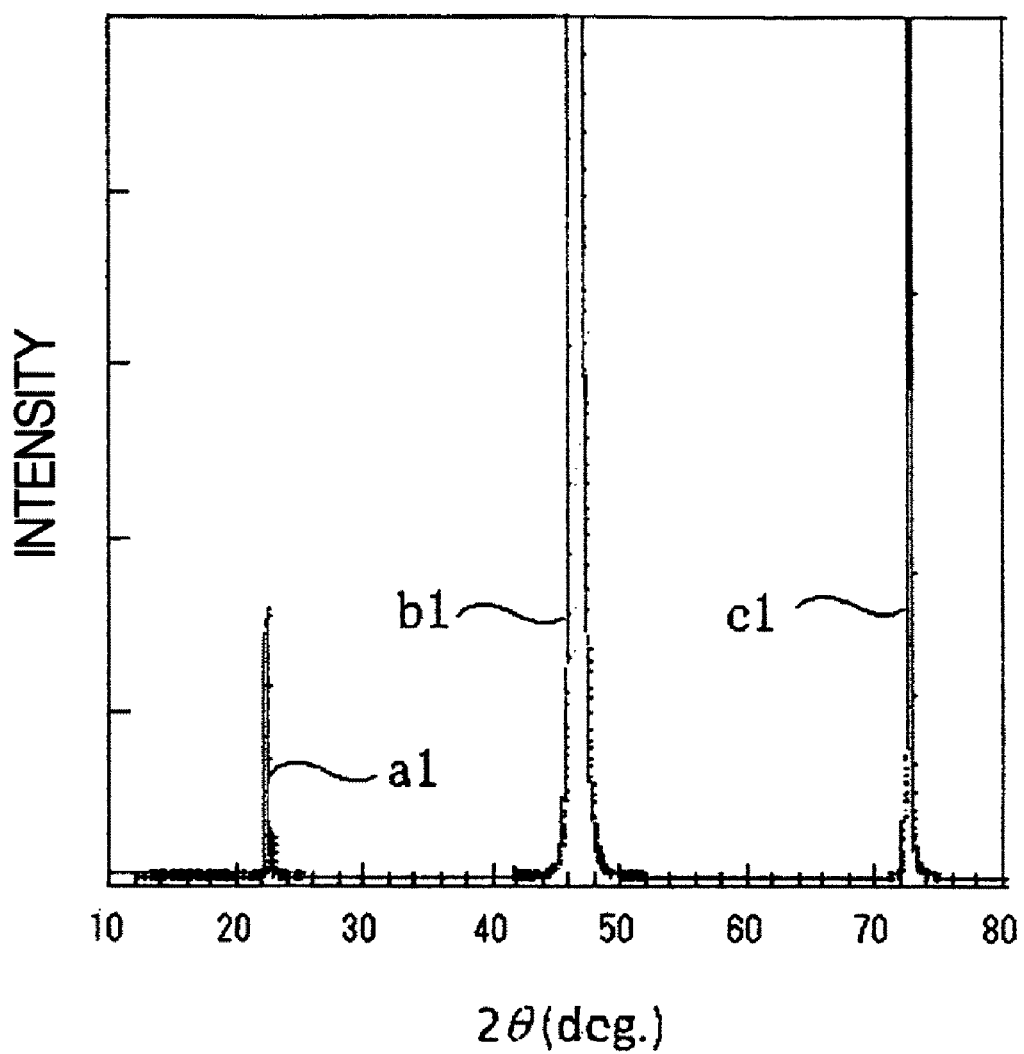
FIG. 2 is a diagram showing an x-ray diffraction pattern during growth at 700° C. according to the invention in the first embodiment.

FIG. 2 is an intensity-2θ characteristic diagram in which a1 is a composition of Nb-STO(100)/CSTO:Pr(100)/STO(100), b1 is a composition of Nb-STO(200)/CSTO:Pr(200)/STO(200), and c1 is a composition of Nb-STO(300)/CSTO:Pr (300)/STO(300). The angle between the incident X-ray and the sample surface is θ, and the angle between the direction of incidence and the direction of reflection is 2θ.

It can be seen that the X-ray diffraction pattern of the thin films appears only in the (001) direction. As a result, it can be seen that the thin films are epitaxially grown in the (001) direction.

Furthermore, in the manufacturing of the perovskite oxide thin film EL element of the present invention, heat treatment was performed on the thin films formed at each of substrate temperatures of 600° C., 700° C., and 800° C., then the upper electrode (transparent electrode) was formed, and the EL characteristics were examined. As a typical example, EL characteristics measured for the sample formed at 700° C. and obtained at an alternating voltage of 25 V at a frequency of 1 kHz are shown in FIG. 3.

Figure 3:
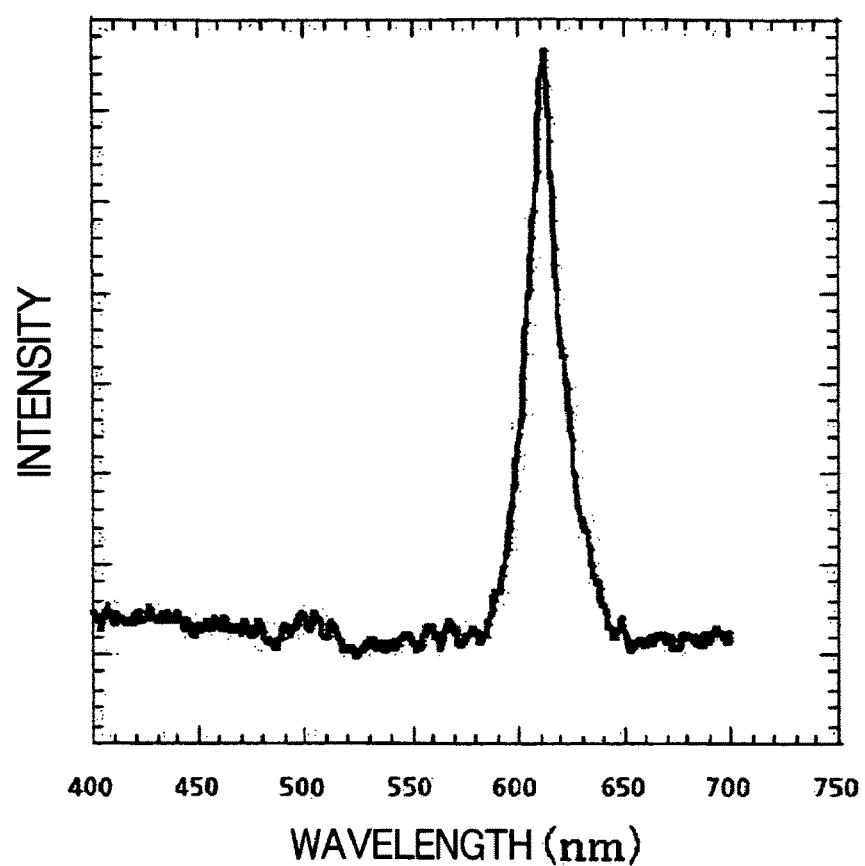
FIG. 3 is a diagram showing EL characteristics measured for a sample formed at 700° C. and obtained at an alternating voltage of 25 V at a frequency of 1 kHz according to the invention in the first embodiment.

In the intensity-wavelength characteristics in FIG. 3, the peak value of intensity is at a wavelength of 612 nm. Its background is confirmed at a wavelength of 580 nm and a wavelength of 640 nm.

The light emission start voltage was in the range of 5 V to 20 V. At about 50 V, dielectric breakdown occurred, and light emission stopped. It was confirmed that light emission occurred in the entire ITO thin film electrode pad formed as the upper electrode (transparent electrode), and it was recognized that the light emission mode was surface light emission. As shown in FIG. 3, light emission characteristics are obtained at a wavelength of 612 nm, and it is understood that the light emission characteristics are red. The light emission start voltage was 5 V to 20 V as described above, and light emission was confirmed in the range of from this light emission start voltage to about 50 V, which was the dielectric breakdown voltage. It was confirmed that this light emission voltage was low voltage drive, compared with the fact that the light emission start voltage with other sulfides and oxides was 200 V or more. Non-Patent Document 7 describes that red fluorescence characteristics are obtained with $((Ca_{1-x}Sr_x)_{1-y}Pr_y)TiO_3$: $0 \leq x \leq 1$ and $0.001 \leq y \leq 0.2$. It is confirmed that similar fluorescence characteristics are also obtained with $((Ca_{1-x}Sr_x)_{1-y}Pr_y)TiO_3$: $0 \leq x \leq 1$ and $0.001 \leq y \leq 0.2$, since these results were obtained with the above stoichiometric composition optimal for the light-emitting material.

Furthermore, since a perovskite oxide epitaxial thin film EL element was successfully obtained by using an oxide perovskite electrically conductive 1% Nb-substituted $SrTiO_3$ single crystal substrate as the substrate material, epitaxial growth is possible even if a substrate material and a perovskite-related electrically conductive thin film material having a lattice constant in the vicinity of 3.905 nm are used. A single substrate is a $SrTiO_3$ single crystal substrate having conductivity with the amount of Nb added being 0.1% or more. Furthermore, it is possible to form a conductive thin film on a substrate having no conductivity for use as the lower electrode. At this time, examples of a perovskite-related, electrically conductive substrate material having no conductivity include $SrTiO_3$, $LaAlO_3$, MgO, $LaGaO_3$, $PrGaO_3$, $NdGaO_3$, and $SrLaAlO_3$. Even if a conductive thin film is formed thereon with $SrRuO_3$, $YBaCuO_7$, or 0.1% or more Nb-substituted $SrTiO_3$ having a lattice constant in the vicinity of 3.905 nm, and an EL element structure is formed thereon, epitaxial growth is achieved. Therefore, since an EL element having excellent crystallinity is obtained, similar characteristics are obtained.

In the invention according to this embodiment, a structure in which the light-emitting layer 3 is sandwiched between the dielectric thin films 2, 4 is used. The EL light emission mechanism is considered as follows. When an electric field is applied to a sandwich structure of a transport layer/a light-emitting layer/a transport layer, electrons trapped at the interface level on the negative electrode side are tunneled to the conduction band of the light-emitting layer. These electrons become "hot" in the process of being accelerated by the applied electric field, and these hot electrons excite localized light-emitting centers. While the light-emitting centers emit light, the electrons losing energy reach the interface on the positive electrode side where the electrons are trapped at the interface level. By making the applied electric field alternating, these series of processes are repeated, and the light emission is continued. Considering this EL light emission mechanism, since light emission is provided by an alternating-current power supply, light emission occurs when at least one dielectric is laminated. In recent study, fluorescence is confirmed by adding a rare earth element, for example, one or more elements of Pr, Eu, Tb, Dy, and Tm, to a perovskite oxide polycrystal. The principle of this fluorescence is considered as follows. When a fluorescent material is irradiated with ultraviolet rays, rare earth atom ions in the crystal are excited. The excited ions fall into the ground state. The energy released at this time becomes light, leading to light emission. In this manner, in the principles of fluorescence and EL, means for exciting rare earth atom ions are externally irradiated light and an electric field respectively, and the principles are totally different from each other. A material exhibiting a fluorescence phenomenon in principle does not always exhibit EL.

A second embodiment of the present invention will be described, using FIGS. 4 to 6.

Figure 4:
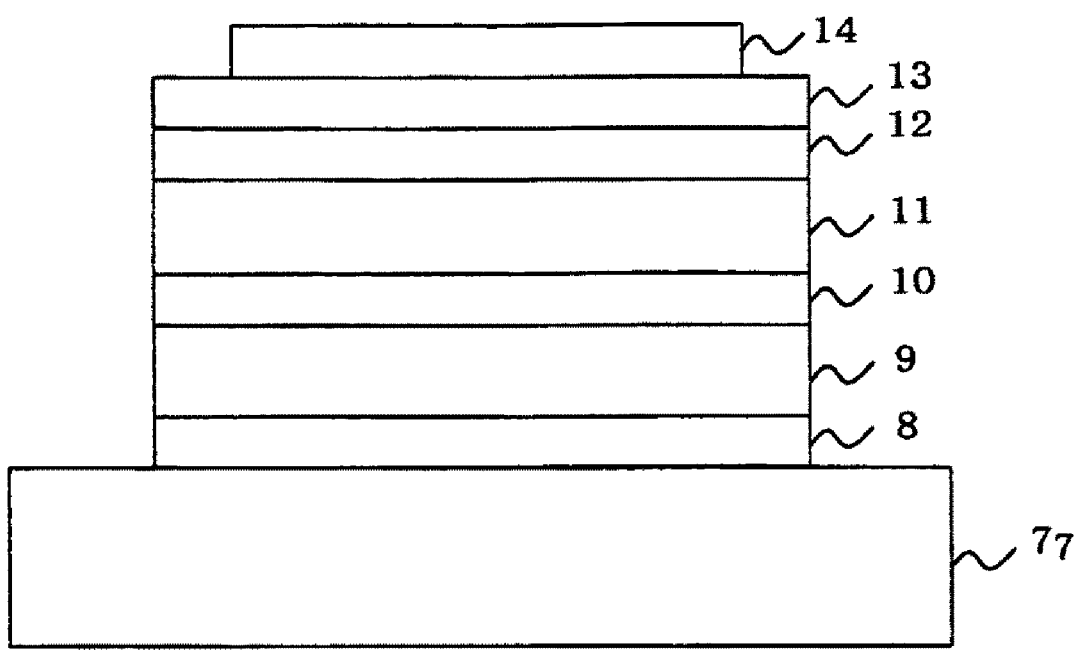
FIG. 4 is a diagram showing the configuration of a perovskite oxide thin film EL element in which a multilayer film of a transport layer 8/a light-emitting layer 9/a transport layer 10/a light-emitting layer 11/a transport layer 120 comprising a thin film is formed on a substrate (lower electrode) 7, and a transparent electrode (upper electrode) 14 is formed thereon via a buffer layer 13, according to the invention in a second embodiment.

FIG. 4 is a diagram showing the configuration of a perovskite oxide thin film EL element in which a multilayer film of a transport layer 8/a light-emitting layer 9/a transport layer 10/a light-emitting layer 11/a transport layer 12 comprising a thin film is formed on a substrate (lower electrode) 7, and a transparent electrode (upper electrode) 14 is formed thereon via a buffer layer 13, according to the invention in this embodiment. The substrate (lower electrode) 7, the multilayer structure of the transport layer 8/the light-emitting layer 9/the transport layer 10/the light-emitting layer 11/the transport layer 12, the buffer layer 13, and the transparent electrode (upper electrode) 14 are all transparent.

In FIG. 4, reference numeral 7 denotes a Nb-substituted STO(100) substrate; reference numeral 8 denotes a transport layer, an epitaxial film, $SrTiO_3$; reference numeral 9 denotes a light-emitting layer, an epitaxial film, $CaSrTiO_3$:Pr; reference numeral 10 denotes a transport layer, an epitaxial film, $SrTiO_3$; reference numeral 11 denotes a light-emitting layer, an epitaxial film, $CaSrTiO_3$:Pr; reference numeral 12 denotes a transport layer, an epitaxial film, $SrTiO_3$; reference numeral 13 denotes a buffer layer, an epitaxial film, $CeO_2$; and reference numeral 14 denotes a transparent electrode, ITO.

The pulse laser deposition method is also used in the manufacturing of the perovskite oxide thin film EL element of the present invention. As a typical example, a polished electrically conductive 1% Nb-substituted $SrTiO_3$(001) single crystal substrate is used for the substrate (lower electrode) 7. A perovskite oxide $SrTiO_3$ thin film, which is the transport layer 8, is formed on the substrate 7 at an oxygen pressure of 700 mTorr at substrate temperatures of 700° C. Then, a perovskite oxide $Ca_{0.6}Sr_{0.4}TiO_3$:0.2% Pr thin film, which is the light-emitting layer 9, is formed at an oxygen pressure of 700 mTorr at substrate temperatures of 700° C. Then, a perovskite oxide $SrTiO_3$ thin film, which is the transport layer 10, is formed at an oxygen pressure of 700 mTorr at substrate temperatures of 700° C. Then, a perovskite oxide $Ca_{0.6}Sr_{0.4}TiO_3$: 0.2% Pr thin film, which is the light-emitting layer 11, is continuously formed at an oxygen pressure of 700 Torr at substrate temperatures of 700° C. Then, a perovskite oxide $SrTiO_3$ thin film, which is the transport layer 12, is formed at an oxygen pressure of 700 mTorr at substrate temperatures of 700° C. Thus, a multilayer structure with five layers of the transport layer 8/the light-emitting layer 9/the transport layer 10/the light-emitting layer 11/the transport layer 12 is formed on the substrate (lower electrode) 7. At this time, the oxygen pressure was varied in the range of 10 mTorr or more and 700 mTorr or less, but similar results were obtained.

Then, a $CeO_2$ film is continuously formed as the buffer layer 13 at an oxygen pressure of 700 mTorr at substrate temperatures of 700° C. It has been experimentally clarified that the indium atoms of the ITO film of the upper electrode 14 cause the luminance degradation of the light-emitting layers 9, 11. This $CeO_2$ buffer layer 13 serves as the buffer layer 13 for completely separating the indium and the light-emitting layer 11.

When the ITO film of the transparent electrode (upper electrode) 14 is formed without performing heat treatment here, and an alternating voltage is applied, dielectric breakdown occurs before the start of light emission, and light emission characteristics are not confirmed. Therefore, atmospheric heat treatment is performed in oxygen in the range of 900° C. or more and 1200° C. or less to improve the withstand voltage of the light-emitting layers 9, 11 to enable light emission, and then, a transparent electrically conductive film, ITO, is formed on top to provide the transparent electrode (upper electrode) 14.

In the manufacturing of the perovskite oxide thin film EL element of the present invention, film formation was performed at each of substrate temperatures of 600° C., 700° C., and 800° C. In order to examine the crystal structure, x-ray diffraction was measured. As a result, it was confirmed that the multilayer structure was epitaxially grown in the (001) direction at all temperatures. As a typical example, an x-ray diffraction pattern during growth at 700° C. is shown in FIG. 5.

Figure 5:
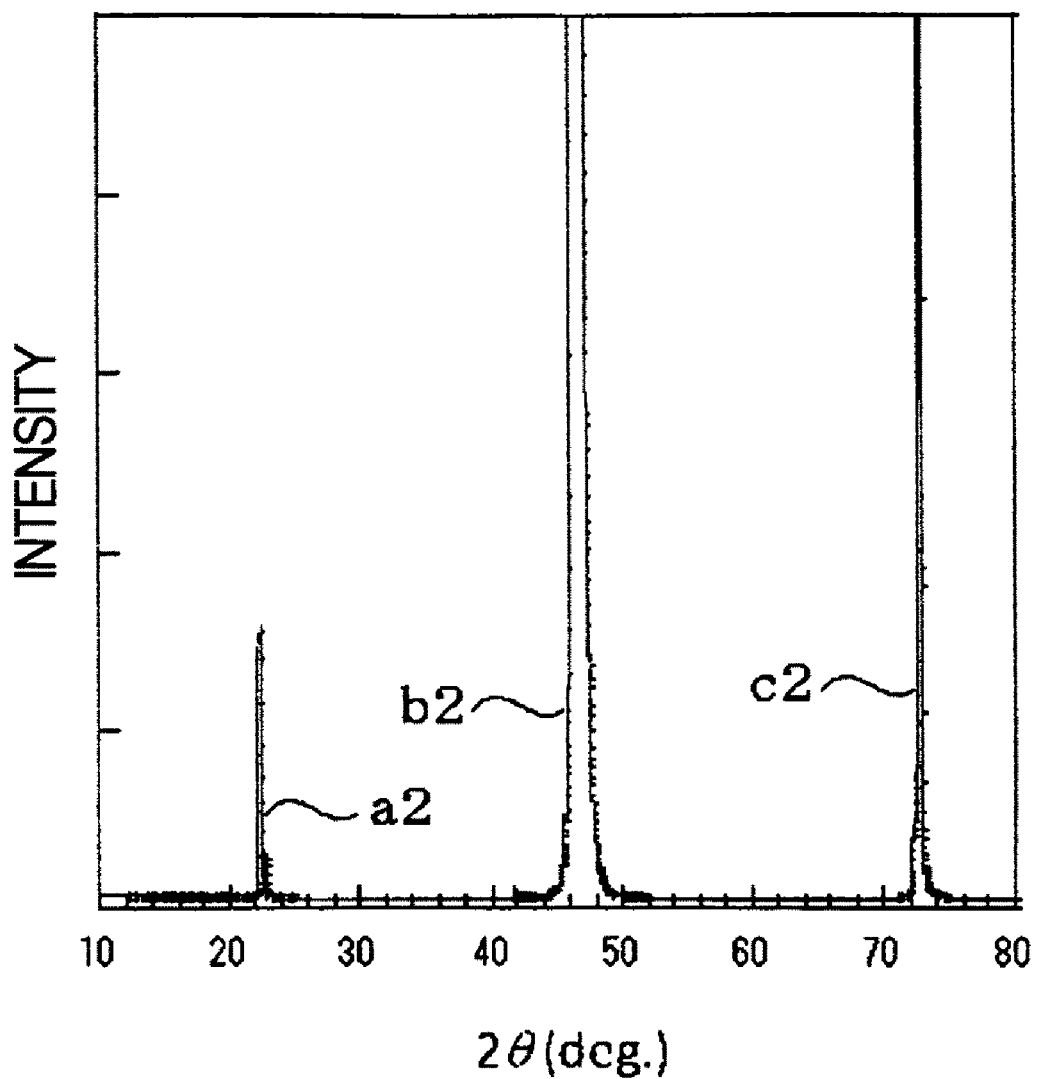
FIG. 5 is a diagram showing an x-ray diffraction pattern during growth at 700° C. according to the invention in the second embodiment.

FIG. 5 is an intensity-2θ characteristic diagram in which a2 is a composition of Nb-STO(100)/CSTO:Pr(100)/STO(100), b2 is a composition of Nb-STO(200)/CSTO:Pr(200)/STO (200), and c2 is a composition of Nb-STO(300)/CSTO:Pr (300)/STO(300).

The pattern of the thin films appears only in the (001) direction. Therefore, it is confirmed that the thin films are epitaxially grown in the (001) direction.

Furthermore, in the manufacturing of the perovskite oxide thin film EL element of the present invention, heat treatment was performed on the thin films formed at each of substrate temperatures of 600° C., 700° C., and 800° C., the transparent electrode (upper electrode) was formed, and the EL characteristics were examined. As a typical example, EL characteristics measured for the sample formed at 700° C. and obtained at an alternating voltage of 40 V at a frequency of 1 kHz are shown in FIG. 6.

Figure 6:
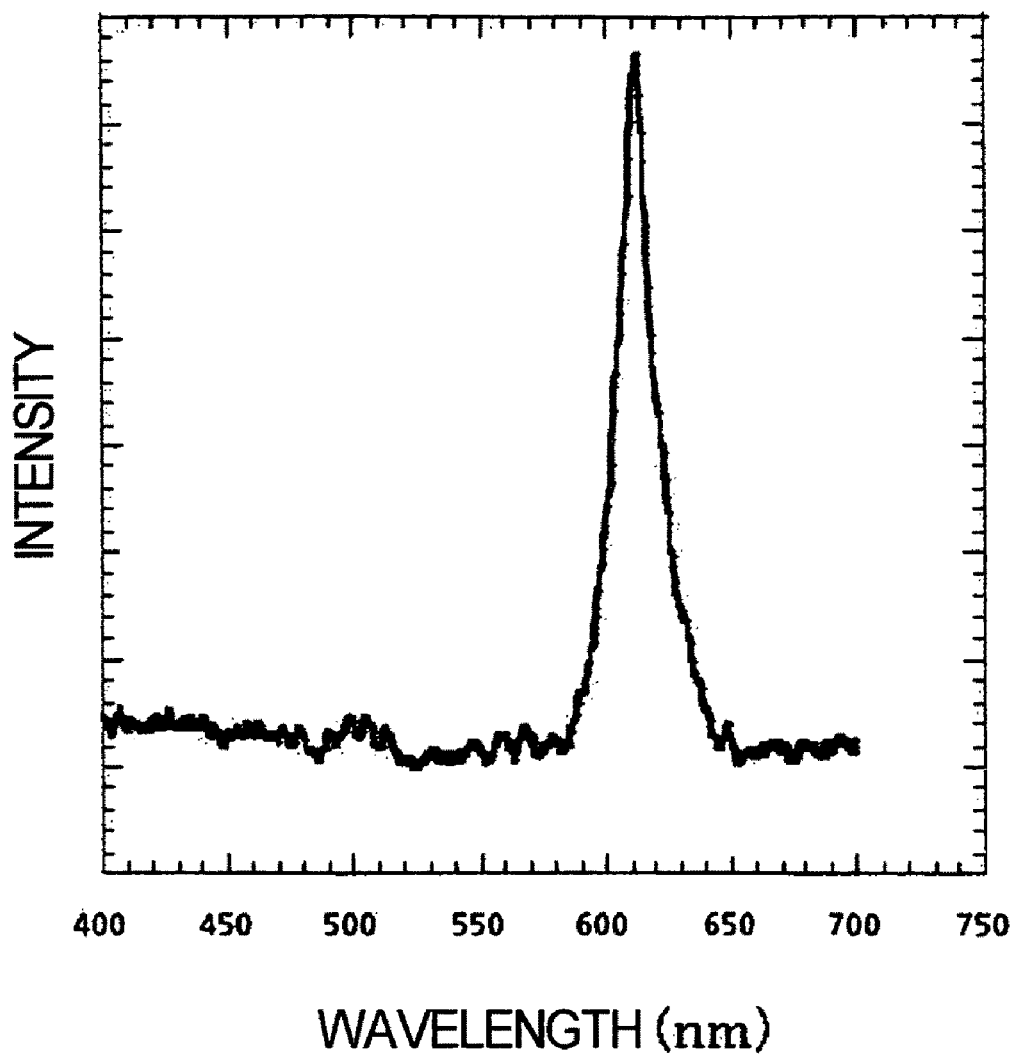
FIG. 6 is a diagram showing EL characteristics measured for a sample formed at 700° C. and obtained at an alternating voltage of 40 V at a frequency of 1 kHz according to the invention in the second embodiment.

In the intensity-wavelength characteristics in FIG. 6, the peak value of intensity is at a wavelength of 612 nm. Its background is confirmed at a wavelength of 580 nm and a wavelength of 640 nm.

The light emission start voltage was in the range of 10 V to 15 V, and light emission was achieved in the range of up to about 50 V. It was confirmed that light emission occurred in the entire ITO thin film electrode pad formed as the transparent electrode (upper electrode), and it was confirmed that the light emission mode was surface light emission. In FIG. 6, light emission characteristics are obtained at a wavelength of 612 nm, and it is understood that the light emission charac-teristics are red. The light emission start voltage was as described above, and therefore, low voltage drive was confirmed. This is considered to be due to the fact that the insulating thin films have a high dielectric constant value because of excellent crystallinity. Non-Patent Document 7 describes that red fluorescence characteristics are obtained with $((Ca_{1-x}Sr_x)_{1-y}Pr_y)TiO_3$: $0 \leq x \leq 1$ and $0.001 \leq y \leq 0.2$. It is confirmed that similar fluorescence characteristics are also obtained with $((Ca_{1-x}Sr_x)_{1-y}Pr_y)TiO_3$: $0 \leq x \leq 1$ and $0.001 \leq y \leq 0.2$, since these results were obtained with the above stoichiometric composition optimal for the light-emitting material.

A third embodiment of the present invention will be described, using FIGS. 7 to 9.

Figure 7:
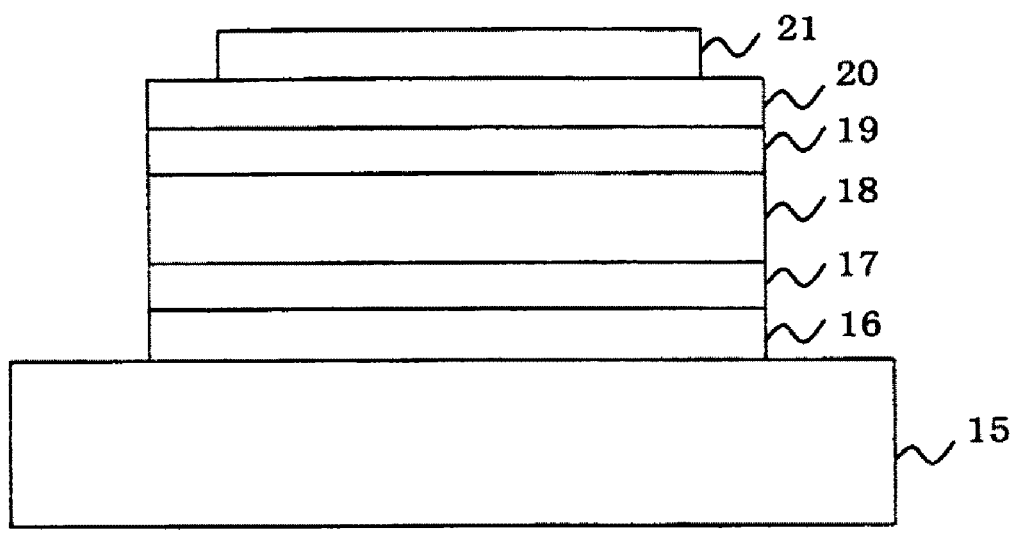
FIG. 7 is a diagram showing the configuration of a perovskite oxide thin film EL element in which a multilayer film of a lower electrode 16/an electron transport layer 17/a light-emitting layer 18/a hole transport layer 19 comprising a thin film is formed on a substrate 15, and a transparent electrode (upper electrode) 21 is formed thereon via a buffer layer 20, according to the invention in a third embodiment.

FIG. 7 is a diagram showing the configuration of a perovskite oxide thin film EL element in which a multilayer film of a lower electrode 16/an electron transport layer 17/a light-emitting layer 18/a hole transport layer 19 comprising a thin film is formed on a substrate 15, and a transparent electrode (upper electrode) 21 is formed thereon via a buffer layer 20, according to the invention in this embodiment. The substrate 15, the multilayer structure of the lower electrode 16/the electron transport layer 17/the light-emitting layer 18/the hole transport layer 19, the buffer layer 20, and the transparent electrode (upper electrode) 21 are all transparent.

In FIG. 7, reference numeral 15 denotes an STO(100) substrate; reference numeral 16 denotes an electrode, an epitaxial film, 1% Nb-substituted $SrTiO_3$; reference numeral 17 denotes an electron transport layer, an epitaxial film, $SrTiO_3$; reference numeral 18 denotes a light-emitting layer, an epitaxial film, $CaSrTiO_3$:Pr; reference numeral 19 denotes a hole transport layer, an epitaxial film, $SrTiO_3$; reference numeral 20 denotes a buffer layer, an epitaxial film, $CeO_2$; and reference numeral 21 denotes a transparent electrode, ITO:

An electrically conductive 1% Nb-substituted $SrTiO_3$ substrate is expensive as the material of the substrate 15. Therefore, a case will be described where $SrTiO_3$(100), which is more inexpensive than the electrically conductive 1% Nb-substituted $SrTiO_3$ substrate, is used as the material of the substrate 15, and a perovskite oxide thin film EL element is made on this substrate 15. As a typical example, an one side polished semitransparent-$SrTiO_3$(001) single crystal substrate having no electrical conductivity is used for the substrate 15. The crystal structure of the substrate 15 is tetragonal. The substrate 15 has a lattice constant of 3.905 nm, has no electrical conductivity, and is used as the lower substrate material. Many perovskite oxide materials have a lattice constant in the vicinity of the numerical value of the above lattice constant and have good lattice matching properties with the substrate 15. Therefore, it is possible to grow an oxide epitaxial thin film having excellent crystallinity grown on the substrate 15. Other than the polished $SrTiO_3$(001) single crystal substrate, there are polished $LaAlO_3$, MgO, $LaGaO_3$, $PrGaO_3$, $NdGaO_3$, and $SrLaAlO_3$ single crystal substrates.

First, a 1% Nb-substituted $SrTiO_3$ thin film is formed on the substrate 15 at an oxygen pressure of 700 mTorr at substrate temperatures of 700° C. to form the lower electrode 16. Next, a perovskite oxide $SrTiO_3$ thin film, which is the electron transport layer 17, is formed at an oxygen pressure of 700 mTorr at substrate temperatures of 700° C. Then, a perovskite oxide $Ca_{0.6}Sr_{0.4}TiO_3$:0.2% Pr thin film, which is the light-emitting layer 18, is formed at an oxygen pressure of 700 mTorr at substrate temperatures of 700° C. Then, a perovskite oxide $SrTiO_3$ thin film, which is the hole transport layer 19, is formed at an oxygen pressure of 700 mTorr at substrate temperatures of 700° C. to manufacture a multilayer structure of the electron transport layer 17/the light-emitting layer 18/the hole transport layer 19 on the lower electrode 16.

Then, a $CeO_2$ film is continuously formed as the buffer layer 20 at an oxygen pressure of 700 mTorr at substrate temperatures of 700° C. It has been experimentally clarified that the indium atoms of an ITO film, which is the transparent upper electrode 21, cause the luminance degradation of the light-emitting layer 18. Therefore, this $CeO_2$ buffer layer 20 serves as the buffer layer 20 for completely separating the indium and the light-emitting layer 18.

When the ITO film, which is the transparent electrode (upper electrode) 21, is formed without performing heat treatment here, and an alternating voltage is applied, dielectric breakdown occurs before the start of light emission, and light emission characteristics are not confirmed. Therefore, atmospheric heat treatment is performed in oxygen in the range of 900° C. or more and 1200° C. or less to improve the withstand voltage of the light-emitting layer 18 to enable light emission, and then, a transparent electrically conductive film, ITO, is formed on top to provide the transparent electrode (upper electrode) 21. The lower electrode 16 is blue close to black because Nb-substituted $SrTiO_3$ is used, and the multilayer structure of the electron transport layer 17/the light-emitting layer 18/the hole transport layer 19 is all transparent.

In the manufacturing of the perovskite oxide thin film EL element of the present invention, film formation was performed at each of substrate temperatures of 600° C., 700° C., and 800° C. In order to examine the crystal structure, x-ray diffraction was measured. As a result, it was confirmed that the multilayer structure was epitaxially grown in the (001) direction at all temperatures. As a typical example, an x-ray diffraction pattern during growth at 700° C. is shown in FIG. 8.

Figure 8:
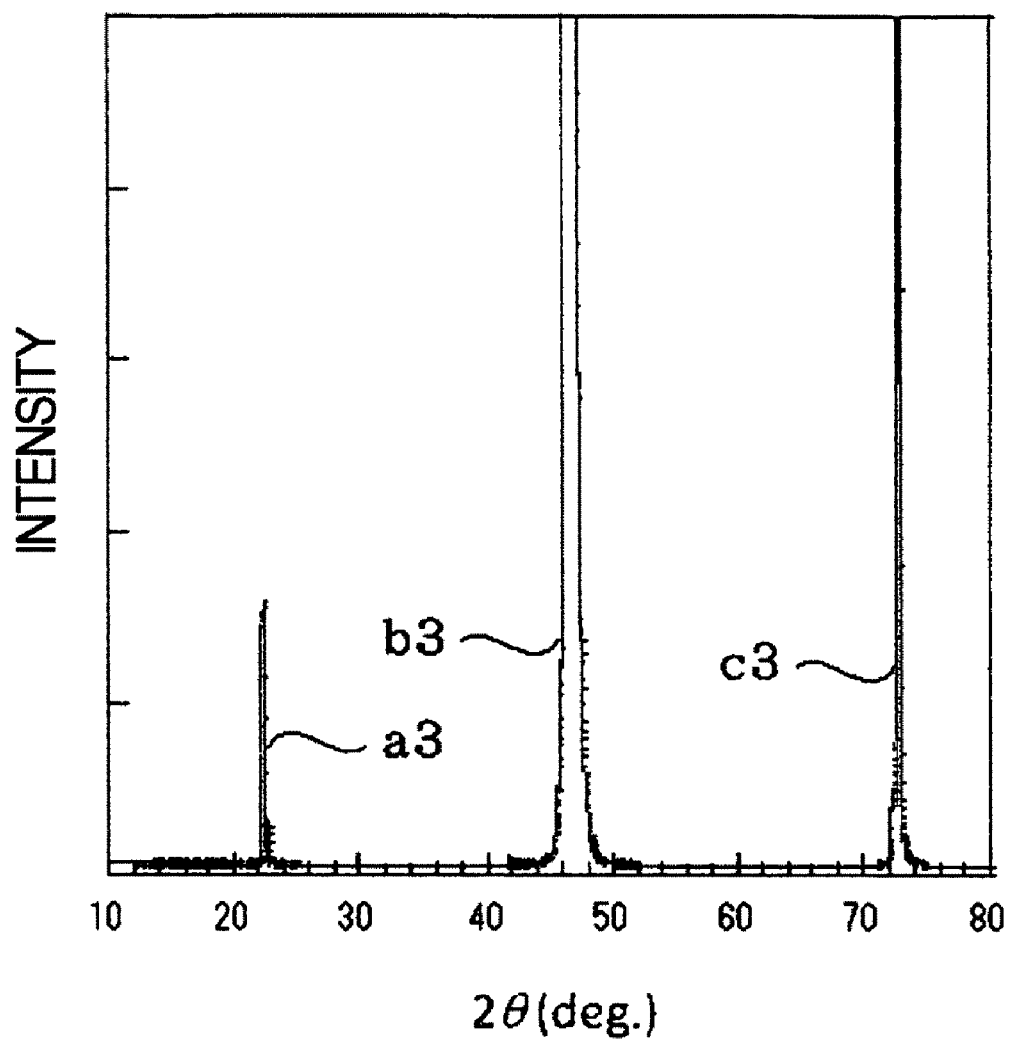
FIG. 8 is a diagram showing an x-ray diffraction pattern during growth at 700° C. according to the invention in the third embodiment.

FIG. 8 is an intensity-2θ characteristic diagram in which a3 is a composition of Nb-STO(100)/CSTO:Pr(100)/STO(100), b3 is a composition of Nb-STO(200)/CSTO:Pr(200)/STO (200), and c3 is a composition of Nb-STO(300)/CSTO:Pr (300)/STO(300).

The pattern of the thin films appears only in the (001) direction. Therefore, it is confirmed that all thin films are epitaxially grown in the (001) direction.

Furthermore, in the manufacturing of the perovskite oxide thin film EL element of the present invention, heat treatment was performed on the thin films formed at each of substrate temperatures of 600° C., 700° C., and 800° C., the transparent electrode (upper electrode) was formed, and the EL characteristics were examined. As a typical example, EL characteristics measured for the sample formed at 700° C. and obtained at an alternating voltage of 25 V at a frequency of 1 kHz are shown in FIG. 9.

Figure 9:
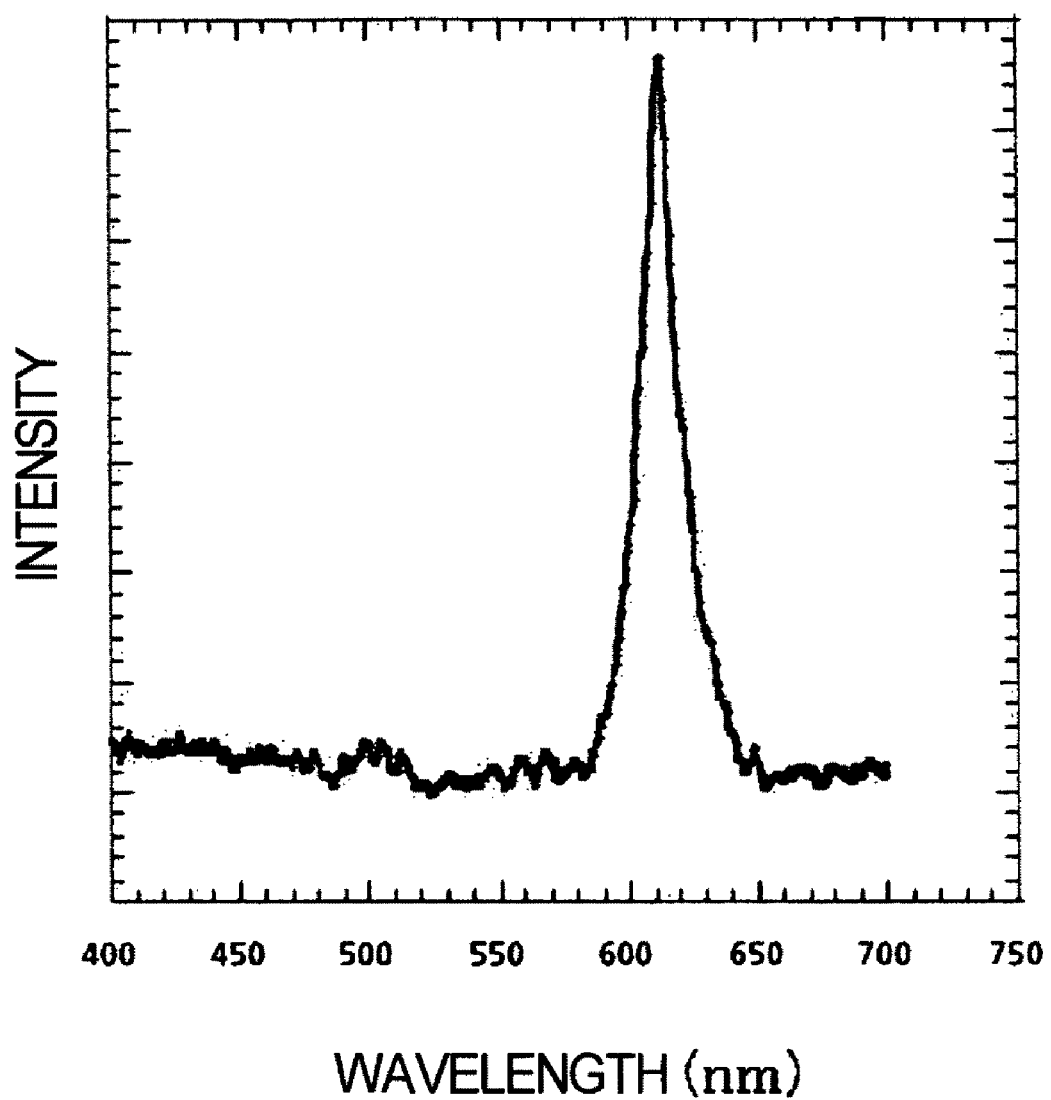
FIG. 9 is a diagram showing EL characteristics measured for a sample formed at 700° C. and obtained at an alternating voltage of 25 V at a frequency of 1 kHz according to the invention in the third embodiment.

In the intensity-wavelength characteristics in FIG. 9, the peak value of intensity is at a wavelength of 612 nm. Its background is confirmed at a wavelength of 580 nm and a wavelength of 640 nm.

The light emission start voltage was in the range of 5 V to 20 V, and light emission was achieved in the range of up to about 50 V. It was confirmed that light emission occurred in the entire ITO thin film electrode pad formed as the transparent electrode (upper electrode), and it was confirmed that the light emission mode was surface light emission. In FIG. 9, light emission characteristics are obtained at a wavelength of 612 nm, and it is understood that the light emission characteristics are red. The light emission start voltage was as described above, and therefore, low voltage drive was confirmed. Non-Patent Document 7 describes that red fluorescence characteristics are obtained with $((Ca_{1-x}Sr_x)_{1-y}Pr_y)TiO_3$: $0 \leq x \leq 1$ and $0.001 \leq y \leq 0.2$. As a result, it is confirmed that similar fluorescence characteristics are also obtained with $((Ca_{1-x}Sr_x)_{1-y}Pr_y)TiO_3$: $0 \leq x \leq 1$ and $0.001 \leq y \leq 0.2$, since these results were obtained with the above stoichiometric composition optimal for the light-emitting material.

Next, a fourth embodiment will be described, using FIGS. 10 to 12.

Figure 10:
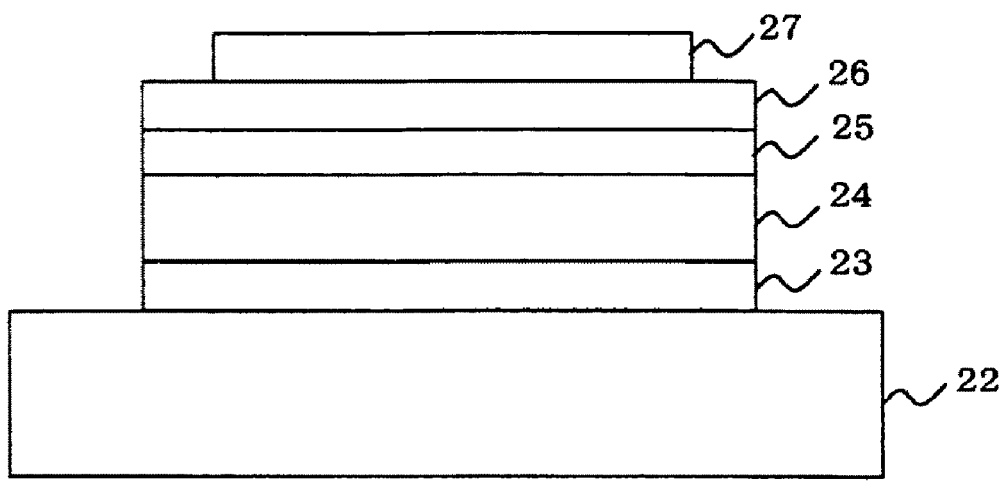
FIG. 10 is a diagram showing the configuration of a perovskite oxide thin film EL element in which a multilayer film of an electron transport layer 23/a light-emitting layer 24/a hole transport layer 25 comprising a thin film is formed on a substrate (lower electrode) 22, and a transparent electrode (upper electrode) 27 is formed thereon via a buffer-layer 26, according to the invention in a fourth embodiment.

FIG. 10 is a diagram showing the configuration of a perovskite oxide thin film EL element in which a multilayer film of an electron transport layer 23/a light-emitting layer 24/a hole transport layer 25 comprising a thin film is formed on a substrate (lower electrode) 22, and a transparent electrode (upper electrode) 27 is formed thereon via a buffer layer 26, according to the invention in this embodiment.

In FIG. 10, reference numeral 22 denotes a Nb-substituted STO(100) substrate; reference numeral 23 denotes an electron transport layer, an epitaxial film, $BaTiO_3$; reference numeral 24 denotes a light-emitting layer, an epitaxial film, $CaSrTiO_3$:Pr; reference numeral 25 denotes a hole transport layer, an epitaxial film, $BaTiO_3$; reference numeral 26 denotes a buffer layer, an epitaxial film, $CeO_2$; and reference numeral 27 denotes a transparent electrode, ITO.

In the perovskite oxide thin film EL element, it is expected that the drive voltage is decreased by the relative dielectric constant of the dielectric material used for the transport layers. The decrease of the drive voltage leads to the miniaturization of a drive power supply when a display is made using the perovskite oxide thin film EL element. Therefore, it is possible to decrease the weight and shape of the panel itself. The invention in this embodiment is characterized by using $BaTiO_3$ as the transport layers 23, 25.

As a typical example, a polished electrically conductive 1% Nb-substituted $SrTiO_3$(001) single crystal substrate is used for the substrate (lower electrode) 22. First, a perovskite oxide $BaTiO_3$ thin film, which is the electron transport layer 23, is formed on the substrate (lower electrode) 22 at an oxygen pressure of 700 mTorr at substrate temperatures of 700° C. Then, a perovskite oxide $Ca_{0.6}Sr_{0.4}TiO_3$:0.2% Pr thin film, which is the light-emitting layer 24, is formed at an oxygen pressure of 700 mTorr at substrate temperatures of 700° C. Then, a perovskite oxide $SrTiO_3$ thin film, which is the hole transport layer 25, is formed at an oxygen pressure of 700 mTorr at substrate temperatures of 700° C. to manufacture a multilayer structure of the electron transport layer 23/the light-emitting layer 24/the hole transport layer 25 on the substrate (lower electrode) 22.

Then, a $CeO_2$ film is continuously formed as the buffer layer 26 at an oxygen pressure of 700 mTorr at substrate temperatures of 700° C. It has been experimentally clarified that the indium atoms of an ITO film, which is the transparent electrode (upper electrode) 27, cause the luminance degradation of the light-emitting layer 24. Therefore, the $CeO_2$ buffer layer 26 for completely separating the indium and the light-emitting layer 24 is provided.

When the ITO film of the transparent electrode (upper electrode) 27 is formed without performing heat treatment here, and an alternating voltage is applied, dielectric breakdown occurs before the start of light emission, and light emission characteristics are not confirmed. Therefore, atmospheric heat treatment is performed in oxygen in the range of 900° C. or more and 1200° C. or less to improve the withstand voltage of the light-emitting layer 24 to enable light emission, and then, a transparent electrically conductive film, ITO, is formed on top for use as the transparent electrode (upper electrode) 27. The substrate (lower electrode) 22, the multilayer structure of the electron transport layer 23/the light-emitting layer 24/the hole transport layer 25, the buffer layer 26, and the transparent electrode (upper electrode) 27 are all transparently formed.

In the manufacturing of the perovskite oxide thin film EL element of the present invention, film formation was performed at each of substrate temperatures of 600° C., 700° C., and 800° C. In order to examine the crystal structure, x-ray diffraction was measured. As a result, it was confirmed that the multilayer structure was epitaxially grown in the (001) direction at all temperatures. As a typical example, an x-ray diffraction pattern during growth at 700° C. is shown in FIG. 11.

Figure 11:
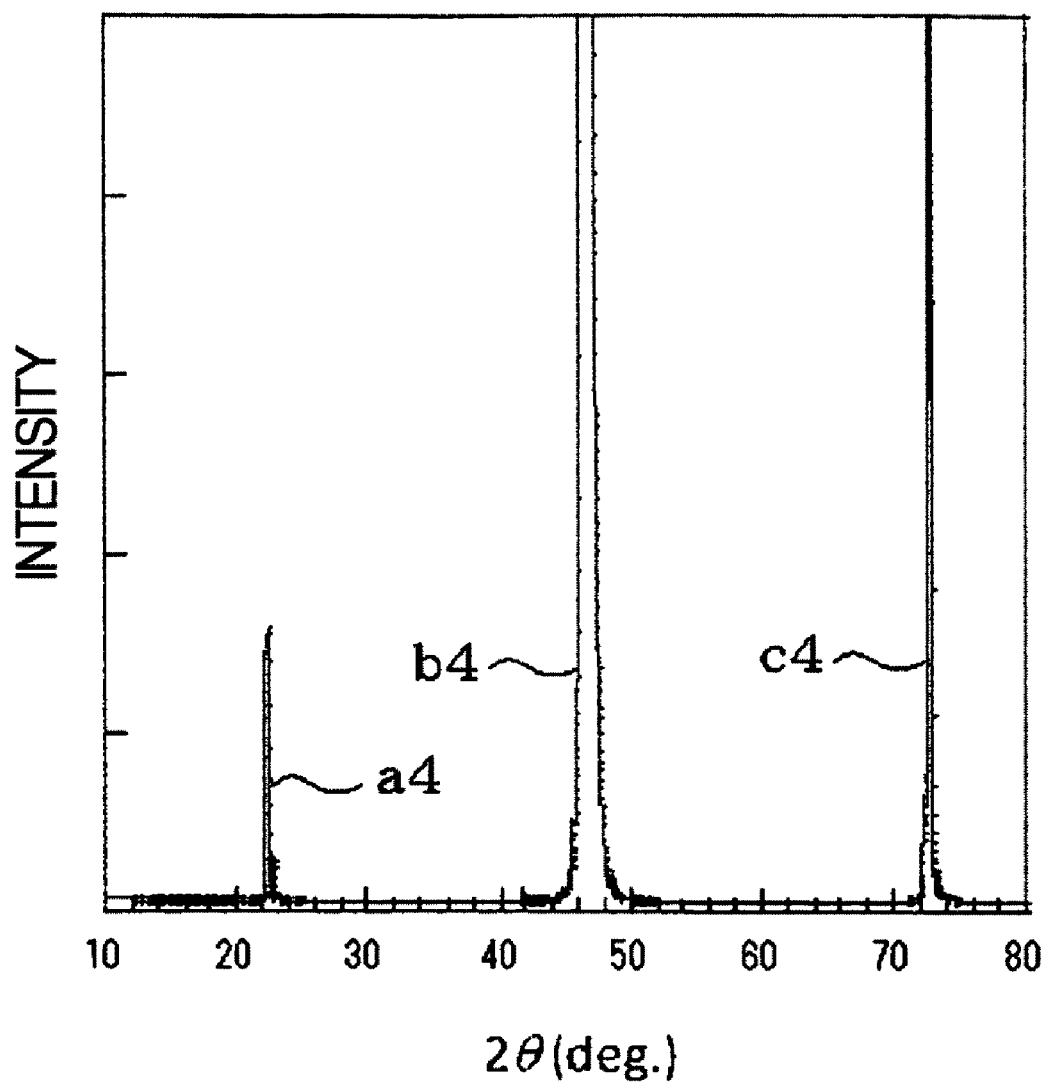
FIG. 11 is a diagram showing an x-ray diffraction pattern during growth at 700° C. according to the invention in the fourth embodiment.

FIG. 11 is an intensity 2θ characteristic diagram in which a4 is a composition of Nb-STO(100)/CSTO:Pr(100)/STO (100), b4 is a composition of Nb-STO(200)/CSTO:Pr(200)/STO(200), and c4 is a composition of Nb-STO(300)/CSTO:Pr(300)/STO(300).

The pattern of the thin films appears only in the (001) direction. Therefore, it is confirmed that the thin films are epitaxially grown in the (001) direction.

Furthermore, in the manufacturing of the perovskite oxide thin film EL element of the present invention, heat treatment was performed on the thin films formed at each of substrate temperatures of 600° C., 700° C., and 800° C., the transparent electrode (upper electrode) was formed, and the EL characteristics were examined. As a typical example, EL characteristics measured for the sample formed at 700° C. and obtained at an alternating voltage of 10 V at a frequency of 1 kHz are shown in FIG. 12.

Figure 12:
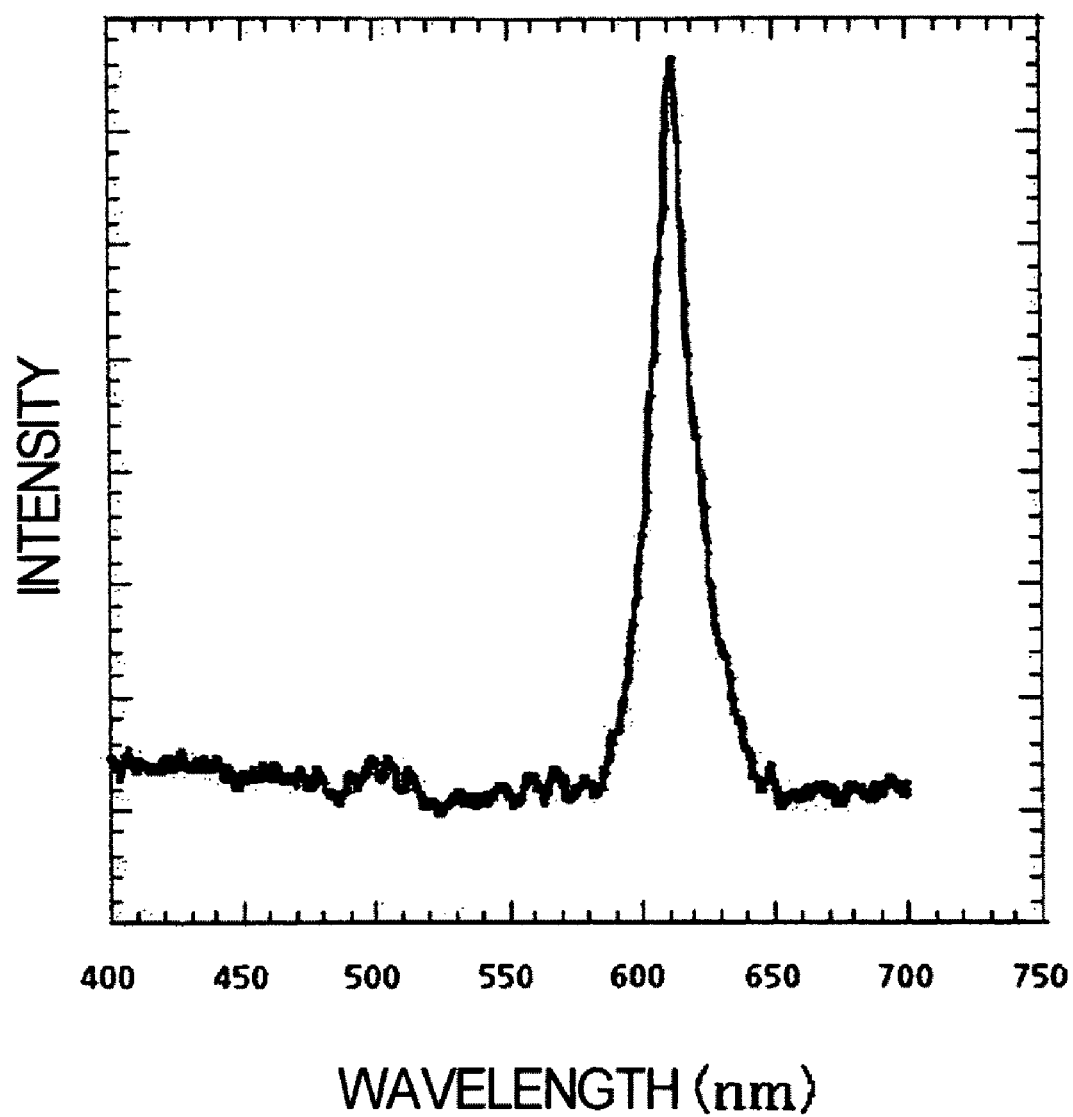
FIG. 12 is a diagram showing EL characteristics measured for a sample formed at 700° C. and obtained at an alternating voltage of 10 V at a frequency of 1 kHz according to the invention in the fourth embodiment.

In the intensity-wavelength characteristics in FIG. 12, the peak value of intensity is at a wavelength of 612 nm. Its background is confirmed at a wavelength of 580 nm and a wavelength of 640 nm.

The light emission start voltage was in the range of 5 V to 8 V, and light emission was achieved in the range of up to about 40 V. It was confirmed that light emission occurred in the entire ITO thin film electrode pad formed as the transparent electrode (upper electrode), and it was confirmed that the light emission mode was surface light emission. In FIG. 12, light emission characteristics are obtained at a wavelength of 612 nm, and it is understood that the light emission characteristics are red. The light emission start voltage was as described above, and therefore, low voltage drive was confirmed. Non-Patent Document 7 describes that red fluorescence characteristics are obtained with $((Ca_{1-x}Sr_x)_{1-y}Pr_y)TiO_3$: $0 \leq x \leq 1$ and $0.001 \leq y \leq 0.2$. As a result, it is confirmed that similar fluorescence characteristics are also obtained with $((Ca_{1-x}Sr_x)_{1-y}Pr_y)TiO_3$: $0 \leq x \leq 1$ and $0.001 \leq y \leq 0.2$, since these results were obtained with the above stoichiometric composition optimal for the light-emitting material.

In the perovskite oxide thin film EL element of the present invention, light emission occurs by applying an alternating voltage, and light emission occurs at both the positive and negative poles of the alternating voltage by sandwiching both sides of the light-emitting layer 24 between the transport layers 23, 25, which are dielectrics. In the case of only one side, light emission occurs with one of either positive or negative polarity. Therefore, EL occurs even if the transport layer 23 or the transport layer 25, which is a dielectric, is formed on either one side of the light-emitting layer 24.

Furthermore, in the inventions in the above embodiments, the lattice constant of the perovskite oxide materials is mainly about 0.39 nm, and a material having a lattice constant in the vicinity of this is used as the light-emitting layer. When a multilayer structure is made with epitaxial thin films, epitaxial growth is performed with a lattice mismatch within ±8%. Therefore, the above EL characteristics are obtained also when a dielectric having a lattice constant in the range of 0.39 nm±0.03 nm is used as the transport layer.

Furthermore, in the inventions in the above embodiments, $CeO_2$ was used as the buffer layer in all structures to prevent the indium atoms of the ITO film from degrading the light-emitting layer. When, experimentally, $CeO_2$ was not formed, the lifetime of light emission was within 1 minute. It was confirmed that the lifetime of the light-emitting layer was significantly improved by the formation of this $CeO_2$ layer. Further, $CeO_2$ was used as the buffer layer, and the ITO film was used as the transparent electrode, but even if this portion was changed to a $SnO_2$ transparent electrode, light emission was obtained.

Figure 13:
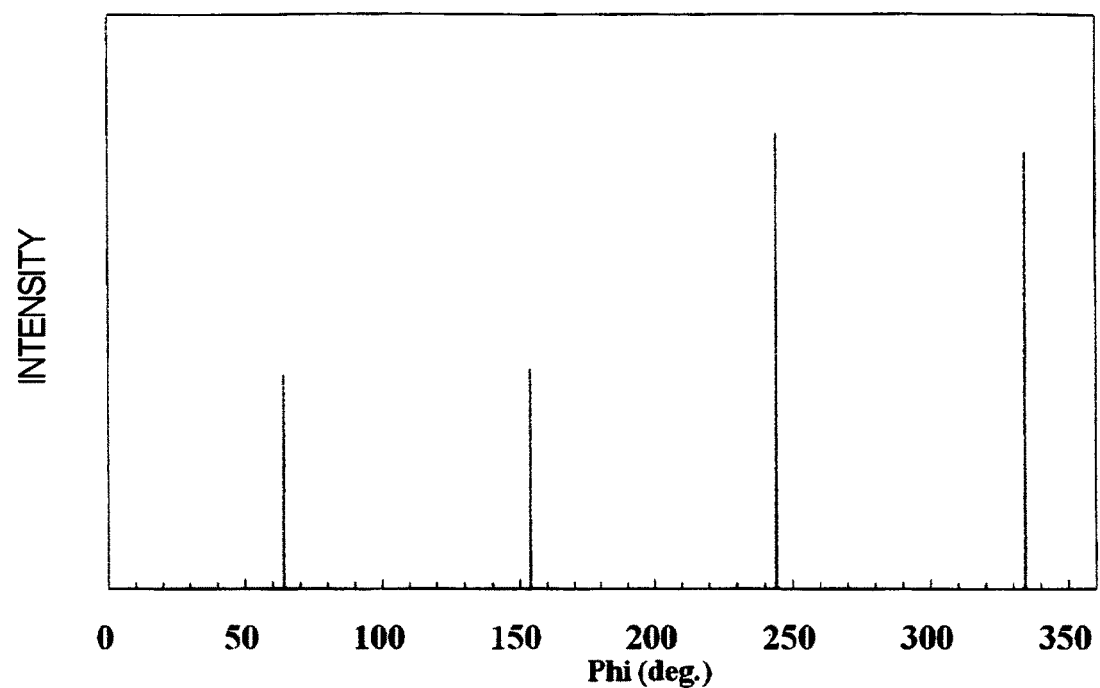
FIG. 13 is intensity-Phi (deg.) characteristics showing the result of the X-ray φ scan of a light-emitting layer, CSTO:Pr (100).

The lattice arrangement and surface structure of the thin films formed in this application, and crystal lattice arrangement at the boundary surfaces between different types of materials will be described below. The result of the X-ray ϕ scan of CSTO:Pr(100), which is the light-emitting layer obtained in the present invention, is shown in FIG. 13. A diffraction peak appears for each 90.0 degrees.

Phi (deg.) is an angle of rotation around one normal perpendicular to a sample surface. As a result, it is confirmed that (010) and (001) are arranged in a plane. In other words, it is clear from FIG. 2, FIG. 5, FIG. 8, and FIG. 11 that (100) is a direction perpendicular to the plane, and it is confirmed that in the CSTO:Pr(100) crystal formed in this application, three crystal axes are oriented. It is also confirmed that the $SrTiO_3$ thin film used for the transport layer in this application, having a lattice constant similar to that of this light-emitting layer, has the lattice arrangement similar to that of the above CSTO:Pr(100).

Figure 14:
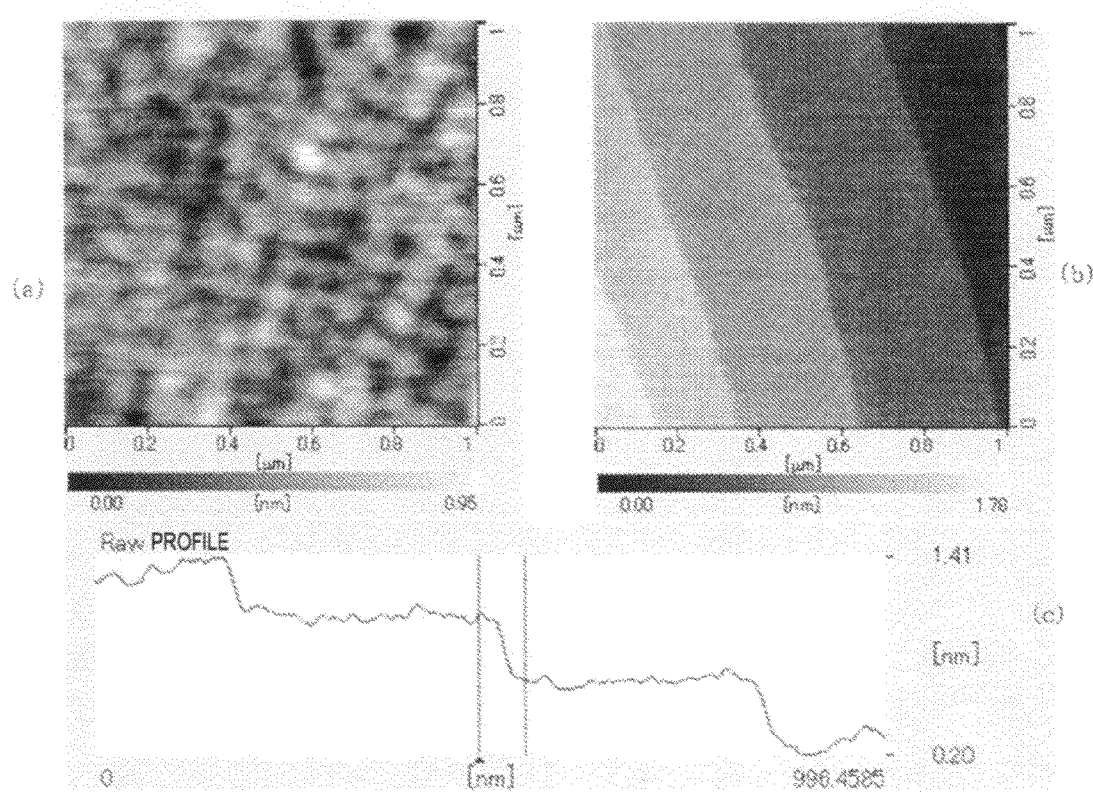
FIG. 14 is a diagram showing the result of the AFM observation of a light-emitting layer.

Next, the result of the AFM observation of the light-emitting layer obtained in the present invention is shown in FIG. 14.

FIG. 14 shows the flatness of an as-grown film surface immediately after film formation (see FIG. 14(a)) and flatness after heat treatment (see FIG. 14(b)). The characteristics in the lower part (see FIG. 14(c)) are the result of line scan for the flatness after heat treatment.

The horizontal axes in FIGS. 14(a), 14(b) are the x-axis in the sample surface and indicate a maximum of 1 (μm). The vertical axes are the y-axis and indicate a maximum of 1 (μm). The horizontal axis in FIG. 14(c) is the x-axis with a maximum of 1 (μm). The vertical axis is the z-axis with a maximum of 1.41 (nm) and represents the degree of unevenness of the surface.

In the characteristics in FIG. 14(c), there are four terraces, and the difference in level between them is 0.39 nm, which is equal to the lattice constant of $(Sr_{0.4}Ca_{0.6})TiO_3$:Pr. It is confirmed that the boundary between the light-emitting layer and the transport layer of the EL element is flat at the atomic level. Next, whether oriented growth occurred continuously in the vicinity of the boundary between the light-emitting layer and the insulator was observed by cross-section TEM.

Figure 15:
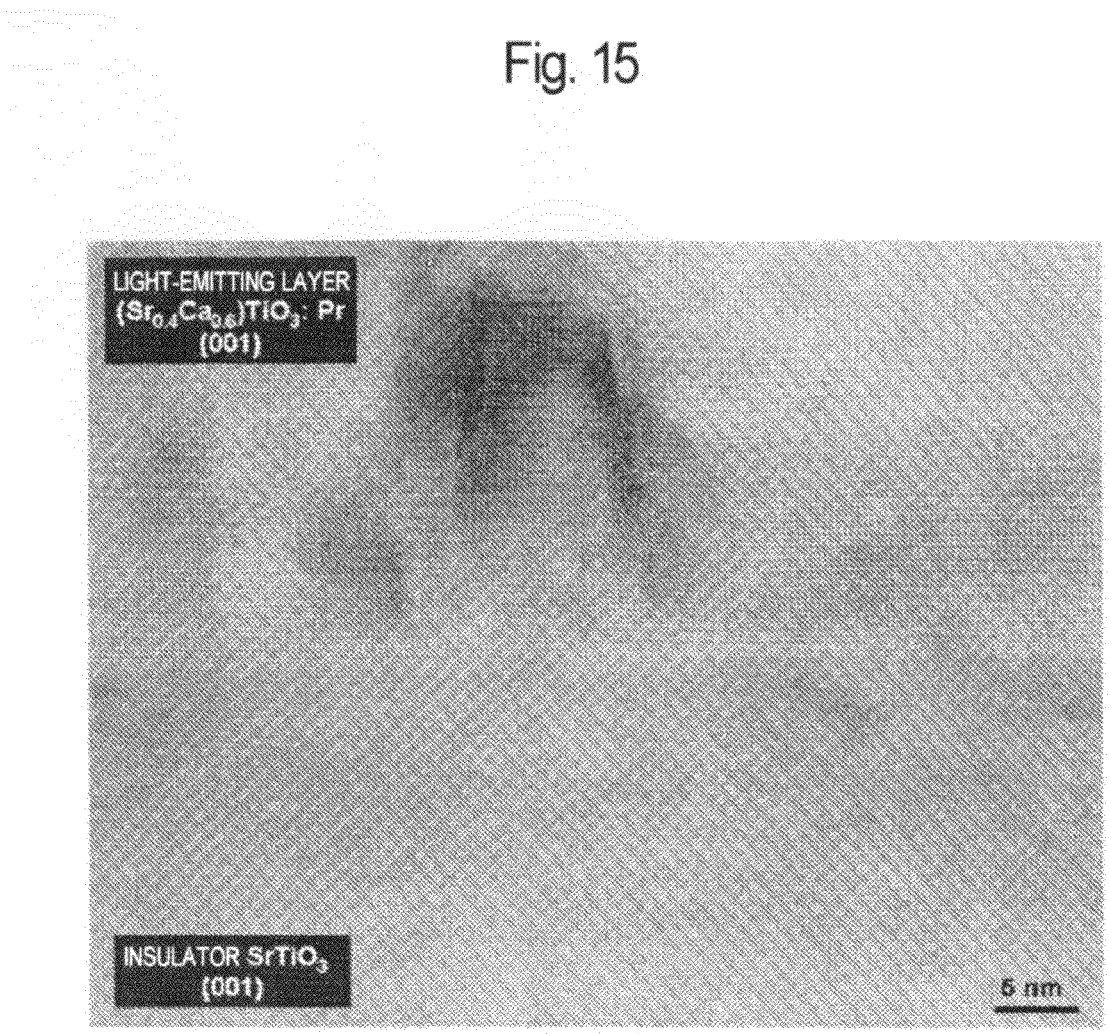
FIG. 15 is a photograph observed by cross-section TEM, showing that oriented growth occurs continuously in the vicinity of the boundary between a light-emitting layer and an insulator.
Figure 16:
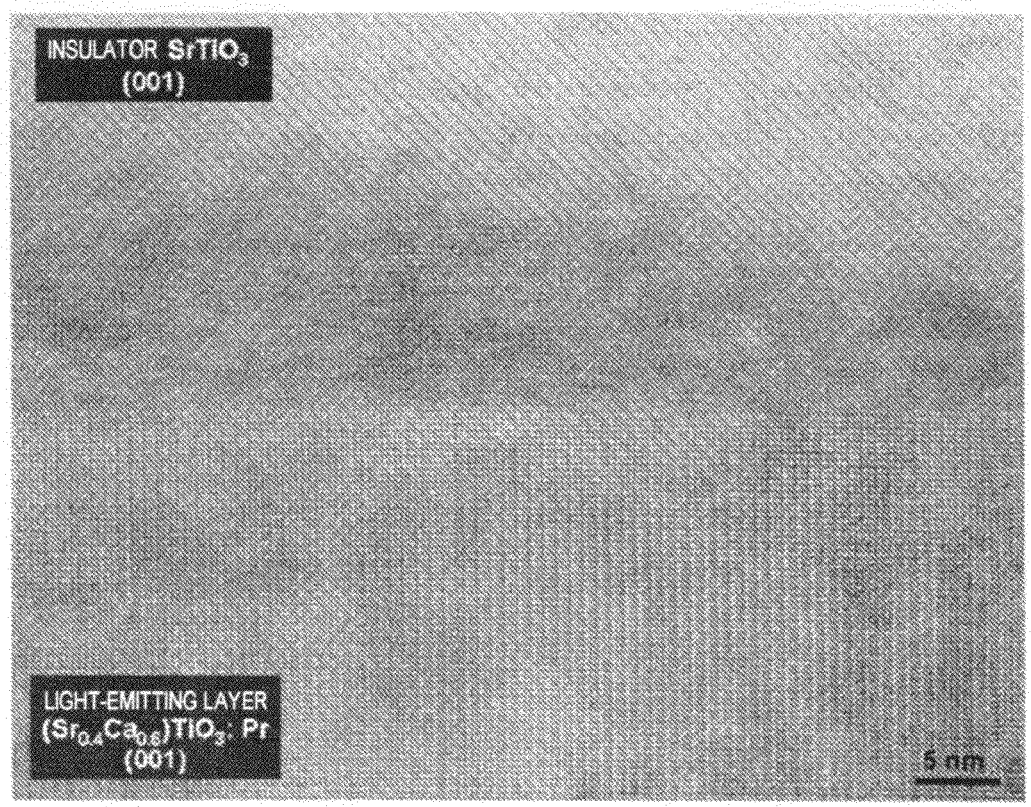
FIG. 16 is a photograph in which oriented growth occurring continuously in the vicinity of the boundary between another light-emitting layer and insulator is observed by cross-section TEM.

The results are described using FIGS. 15, 16.

FIG. 15 is the result of observation of the vicinity of the boundary between the lower transport layer and the light-emitting layer of the transport layer/the light-emitting layer/the transport layer on the single crystal substrate. It is confirmed that the crystal lattice is continuously arranged above and below the boundary.

FIG. 16 is the result of observation of the vicinity of the boundary between the light-emitting layer and the upper transport layer of the transport layer/the light-emitting layer/the transport layer on the single crystal substrate. It is confirmed that the crystal lattice is continuously arranged above and below the boundary.

From these results, it is confirmed that multiple oriented growth occurs continuously at the boundaries having a normal interface with flatness on the atomic order.

This application is characterized in that multiple oriented growth occurs continuously near the boundaries between different materials. As a result, a suitable state density distribution is obtained in the vicinity of the boundary between the transport layer comprising the insulator and the light-emitting layer. Carriers are produced during electric field application, and the carriers are accelerated by a voltage applied to the light-emitting layer. The accelerated carriers collide with rare earth atom-ions, which are light-emitting centers, contribute energy, and are excited, leading to light emission. This light emission process is largely different from the process of fluorescence, and it is not meant that materials with fluorescence all exhibit EL.

The invention claimed is:

1. An oriented perovskite oxide thin film EL element comprising:
   a lower electrode comprising a polished single crystal substrate,
   a first transport epitaxial layer comprising an oriented perovskite oxide thin film, which is a dielectric, formed on the single crystal substrate,
   a light-emitting epitaxial layer comprising an oriented perovskite oxide thin film formed on the first transport epitaxial layer,
   a second transport epitaxial layer comprising an oriented perovskite oxide thin film, which is a dielectric, formed on the light-emitting epitaxial layer,
   a buffer layer formed on the second transport epitaxial layer, and
   a transparent upper electrode formed on the buffer layer.

2. The oriented perovskite oxide thin film EL element according to claim 1, wherein each of the first and second transport epitaxial layers comprising perovskite oxide, which is a dielectric, has a lattice constant in the range of 0.39 nm±0.03 nm.

3. The oriented perovskite oxide thin film EL element according to claim 1, wherein the transparent upper electrode comprises an ITO film, and wherein the buffer layer inhibits a luminance degradation of the light-emitting epitaxial layer by indium atoms.

4. An oriented perovskite oxide thin film EL element comprising:
   a lower electrode comprising a polished single crystal substrate,
   a first transport epitaxial layer comprising an oriented perovskite oxide thin film, which is a dielectric, formed on the single crystal substrate,
   a first light-emitting epitaxial layer comprising an oriented perovskite oxide thin film formed on the first transport epitaxial layer,
   a second transport epitaxial layer comprising an oriented perovskite oxide thin film, which is a dielectric, formed on the first light-emitting epitaxial layer,
   a second light-emitting epitaxial layer comprising an oriented perovskite oxide thin film formed on the first transport epitaxial layer formed on the second transport layer,
   a third transport epitaxial layer comprising an oriented perovskite oxide thin film, which is a dielectric, formed on the second light-emitting epitaxial layer,
   a buffer layer formed on the third transport epitaxial layer, and
   a transparent upper electrode formed on the buffer layer.

5. The oriented perovskite oxide thin film EL element according to claim 4, wherein the transparent upper electrode comprises an ITO film, and wherein the buffer layer inhibits a luminance degradation of the light-emitting epitaxial layer by indium atoms.

6. An oriented perovskite oxide thin film EL element for emitting red light comprising:
   a lower electrode comprising a polished single crystal substrate of $SrTiO_3(001)$ in which 0.1% or more of Ti is substituted with Nb,
   a first transport epitaxial layer comprising an oriented thin film of perovskite oxide $SrTiO_3$, which is a dielectric, formed on the single crystal substrate,
   a light-emitting epitaxial layer comprising an oriented thin film of perovskite oxide $((Ca_{1-x}Sr_x)_{1-y}Pr_y)TiO_3$: $0 \leq x \leq 1$ and $0.001 \leq y \leq 0.2$ formed on the first transport epitaxial layer,
   a second transport epitaxial layer comprising an oriented thin film of perovskite oxide $SrTiO_3$, which is a dielectric, formed on the light-emitting epitaxial layer,
   a $CeO_2$ film buffer layer formed on the second transport epitaxial layer, and
   a transparent upper electrode comprising an ITO film formed on the buffer layer.

7. An oriented perovskite oxide thin film EL element for emitting red light comprising:
   a lower electrode comprising a polished single crystal substrate of $SrTiO_3(001)$ in which 0.1% or more of Ti is substituted with Nb,
   a first transport epitaxial layer comprising an oriented thin film of perovskite oxide $SrTiO_3$, which is a dielectric, formed on the single crystal substrate,
   a first light-emitting epitaxial layer comprising an oriented thin film of perovskite oxide $((Ca_{1-x}Sr_x)_{1-y}Pr_y)TiO_3$: $0 \leq x \leq 1$ and $0.001 \leq y \leq 0.2$ formed on the first transport epitaxial layer,
   a second transport epitaxial layer comprising an oriented thin film of perovskite oxide $SrTiO_3$, which is a dielectric, formed on the first light-emitting epitaxial layer,
   a second light-emitting epitaxial layer comprising an oriented thin film of perovskite oxide $((Ca_{1-x}Sr_x)_{1-y}Pr_y)TiO_3$: $0 \leq x \leq 1$ and $0.001 \leq y \leq 0.2$ formed on the second transport epitaxial layer,
   a third transport epitaxial layer comprising an oriented thin film of perovskite oxide $SrTiO_3$, which is a dielectric, formed on the second light-emitting epitaxial layer,
   a $CeO_2$ film buffer layer formed on the third transport epitaxial layer, and
   a transparent upper electrode comprising an ITO film formed on the buffer layer.

8. An oriented perovskite oxide thin film EL element for emitting red light comprising:
   a polished single crystal substrate of $SrTiO_3(001)$,
   a lower electrode comprising an oriented thin epitaxial film of $SrTiO_3$ in which 0.1% or more of Ti is substituted with Nb, formed on the single crystal substrate,
   a first transport epitaxial layer comprising an oriented thin film of perovskite oxide $SrTiO_3$, which is a dielectric, formed on the lower electrode,
   a light-emitting epitaxial layer comprising an oriented thin film of perovskite oxide $((Ca_{1-x}Sr_x)_{1-y}Pr_y)TiO_3$: $0 \leq x \leq 1$ and $0.001 \leq y \leq 0.2$ formed on the first transport epitaxial layer,
   a second transport epitaxial layer comprising an oriented thin film of perovskite oxide $SrTiO_3$, which is a dielectric, formed on the light-emitting epitaxial layer,
   a $CeO_2$ film buffer layer formed on the second transport epitaxial layer, and a transparent upper electrode comprising an ITO film formed on the buffer layer.

9. An oriented perovskite oxide thin film EL element for emitting red light comprising:

a lower electrode comprising a polished single crystal substrate of $SrTiO_3(001)$ in which 0.1% or more of Ti is substituted with Nb, a first transport epitaxial layer comprising an oriented thin film of perovskite oxide $BaTiO_3$, which is a dielectric, formed on the single crystal substrate, a light-emitting epitaxial layer comprising an oriented thin film of perovskite oxide $((Ca_{1-x}Sr_x)_{1-y}Pr_y)TiO_3$: $0 \leqq x \leqq 1$ and $0.001 \leqq y \leqq 0.2$ formed on the first transport epitaxial layer, a second transport epitaxial layer comprising an oriented thin film of perovskite oxide $BaTiO_3$, which is a dielectric, formed on the light-emitting epitaxial layer, a $CeO_2$ film buffer layer formed on the second transport epitaxial layer, and a transparent upper electrode comprising an ITO film formed on the buffer layer.

* * * * *